(12) United States Patent
Lee

(10) Patent No.: US 9,712,624 B2
(45) Date of Patent: *Jul. 18, 2017

(54) SECURE VIRTUAL NETWORK PLATFORM FOR ENTERPRISE HYBRID CLOUD COMPUTING ENVIRONMENTS

(71) Applicant: Zentera Systems, Inc., San Jose, CA (US)

(72) Inventor: Jaushin Lee, Saratoga, CA (US)

(73) Assignee: Zentera Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/347,414

(22) Filed: Nov. 9, 2016

(65) Prior Publication Data

US 2017/0064005 A1   Mar. 2, 2017

Related U.S. Application Data

(63) Continuation of application No. 14/187,091, filed on Feb. 21, 2014, now Pat. No. 9,525,564.

(Continued)

(51) Int. Cl.
*G06F 15/177* (2006.01)
*H04L 29/08* (2006.01)
(Continued)

(52) U.S. Cl.
CPC ........ *H04L 67/141* (2013.01); *H04L 12/4641* (2013.01); *H04L 49/70* (2013.01); *H04L 67/10* (2013.01)

(58) Field of Classification Search
CPC ........ G06F 11/34; G06F 9/455; G06F 9/5072; H04L 41/04; H04L 41/12; H04L 41/142;
(Continued)

(56) References Cited

U.S. PATENT DOCUMENTS 5,386,417 A    1/1995   Daugherty
6,717,956 B1 *  4/2004   Fan ................... H04L 29/12009
                                               370/389

(Continued)

FOREIGN PATENT DOCUMENTS

EP          1443701 A1       8/2004
WO      WO 2012130523       10/2012

*Primary Examiner* — David Lazaro
*Assistant Examiner* — Berhanu Shitayewoldetsad
(74) *Attorney, Agent, or Firm* — Staniford Tomita LLP

(57) ABSTRACT

Clusters of virtual network switches (VNS) and controllers are provided. The controller cluster is connected to the VNS cluster which is between first and second network domains. A request is received at a first end point in the first network domain to connect to a second end point in the second network domain. If the connection should be through a virtual network connecting the network domains, a virtual network connection is established as allowed by a controller of the controller cluster. The establishment includes initiating first outbound traffic from the first end point to a VNS of the VNS cluster and initiating second outbound traffic from the second end point to the VNS. The VNS places a payload from the first outbound traffic into a reply to the second outbound traffic.

20 Claims, 16 Drawing Sheets

Related U.S. Application Data

(60) Provisional application No. 61/769,691, filed on Feb. 26, 2013, provisional application No. 61/770,320, filed on Feb. 28, 2013.

(51) Int. Cl.
  *H04L 12/46* (2006.01)
  *H04L 12/931* (2013.01)

(58) Field of Classification Search
  CPC . H04L 41/5096; H04L 43/0817; H04L 63/00; H04L 67/1097; H04L 67/125; H04L 69/02; H04L 12/4641; H04L 45/54
  USPC .......................................... 709/228, 229–245
  See application file for complete search history.

(56) References Cited

U.S. PATENT DOCUMENTS

| | | | |
|---|---|---|---|
| 6,914,905 B1 | 7/2005 | Yip | |
| 7,013,345 B1 | 3/2006 | Brown | |
| 7,043,757 B2 | 5/2006 | Hoefelmeyer | |
| 7,966,388 B1 | 6/2011 | Pugaczewski | |
| 8,250,642 B2 | 8/2012 | Bartholomy et al. | |
| 8,640,218 B2 | 1/2014 | Bartholomy et al. | |
| 9,224,003 B2 | 12/2015 | Andersen | |
| 9,240,962 B2 | 1/2016 | Jung | |
| 2003/0016664 A1 | 1/2003 | MeLampy | |
| 2003/0016678 A1 | 1/2003 | Maeno | |
| 2003/0051169 A1 | 3/2003 | Sprigg | |
| 2004/0024903 A1 | 2/2004 | Costatino | |
| 2004/0047322 A1 | 3/2004 | O'Neill | |
| 2004/0059827 A1 | 3/2004 | Chiang | |
| 2004/0181694 A1 | 9/2004 | Cox | |
| 2005/0257264 A1 | 11/2005 | Stolfo et al. | |
| 2006/0031472 A1 | 2/2006 | Rajavelu et al. | |
| 2007/0019622 A1* | 1/2007 | Alt | H04L 29/06027 370/352 |
| 2008/0165957 A1 | 7/2008 | Kandasamy et al. | |
| 2008/0276313 A1 | 11/2008 | Kummu et al. | |
| 2008/0295114 A1 | 11/2008 | Argade | |
| 2009/0016358 A1 | 1/2009 | Lee | |
| 2011/0090911 A1 | 4/2011 | Hao | |
| 2012/0005724 A1 | 1/2012 | Lee | |
| 2012/0124566 A1 | 5/2012 | Federighi et al. | |
| 2012/0284770 A1 | 11/2012 | Bartholomy | |
| 2012/0307682 A1 | 12/2012 | Johnsen | |
| 2013/0091198 A1 | 4/2013 | Yu | |
| 2013/0182604 A1 | 7/2013 | Moreno | |
| 2013/0188514 A1* | 7/2013 | Jain | H04L 61/103 370/254 |
| 2013/0198304 A1 | 8/2013 | Jung | |
| 2014/0068698 A1 | 3/2014 | Burchfield et al. | |
| 2014/0068701 A1 | 3/2014 | Burchfield et al. | |
| 2014/0136635 A1 | 5/2014 | Jeng | |
| 2015/0113279 A1 | 4/2015 | Andersen | |

* cited by examiner

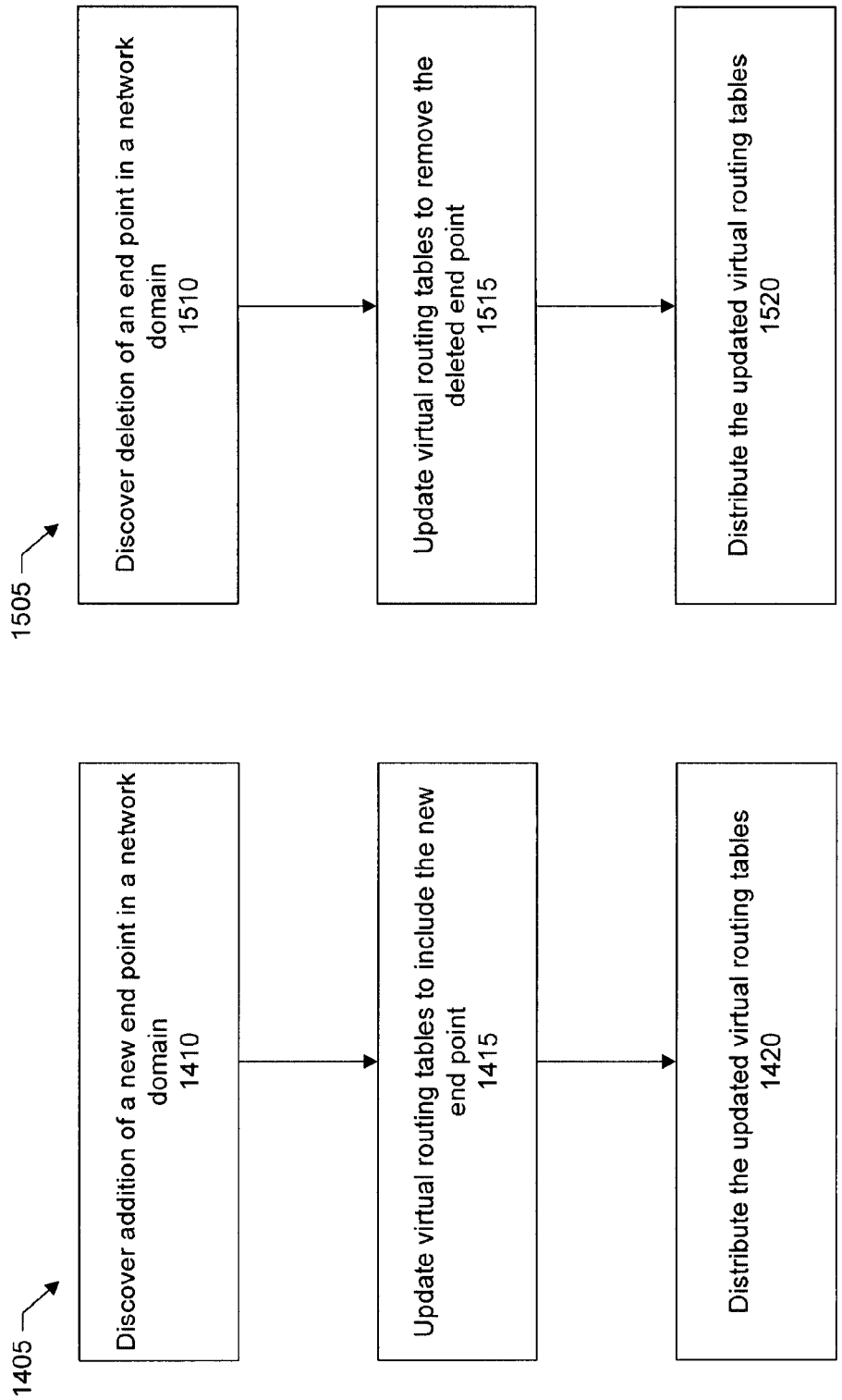

SECURE VIRTUAL NETWORK PLATFORM FOR ENTERPRISE HYBRID CLOUD COMPUTING ENVIRONMENTS

CROSS-REFERENCE TO RELATED APPLICATIONS

This patent application claims priority to U.S. patent application Ser. No. 14/187,091, filed Feb. 21, 2014, which claims priority to U.S. provisional patent application 61/769,691, filed Feb. 26, 2013, and also claims the benefit of U.S. provisional patent application 61/770,320, filed Feb. 28, 2013, which are all incorporated by reference along with all other references cited in this application.

BACKGROUND

The present invention relates to the field of information technology, including, more particularly, to systems and techniques for networking.

Enterprise cloud computing is becoming inevitable. The advancement of mobile devices such as smart phones and touch pads has further pushed the deployment of cloud computing infrastructure to support various business applications online. According to market research analysts, by end of 2016, more than 15 percent of worldwide enterprise IT spending will be on public or hybrid cloud computing environments.

While much of the world is embracing cloud computing, cloud deployments still require intensive customization efforts and remain challenging for enterprises to establish a hybrid infrastructure, on demand, connecting applications (e.g., client-server software) and computing resources in public and private computing environments without compromising enterprise security and compliance.

The conventional IT network and infrastructure security technology does not directly apply to the hybrid environments. To brute force a connection, enterprise IT is facing a tremendous amount of operating risks and efforts to accomplish their mission. A next-generation platform is needed to address the needs.

The world top-tier cloud service providers have extensive experience in deploying a flat cloud computing infrastructure inside a single datacenter. To facilitate ease of management and on demand services, the implementation has been featuring a unified network and infrastructure security supporting the cloud. This approach significantly simplifies the management of applications running in the cloud by eliminating the complexity for network and infrastructure security. While this approach may be appropriate within the environment of a single datacenter, it is difficult to apply in a hybrid cloud environment, where the underlying network and infrastructure security are distributed, segregated, and belong to multiple authorities.

More particularly, in modern enterprises, the network and security infrastructure are specifically designed to implement corporate security and compliance governance. The critical business data and operations are typically deployed in the inner layer of a network domain behind layers of firewalls. Such a secure network and firewall system block the external malicious access intents or at least make it extremely challenging to penetrate. However, on the other hand, if there is any new business initiative that requires an access connection from an external location to reach the inner most layers, it can be extremely difficult or could require a tremendous amount of corporate IT efforts to re-provision the environment and to allow the traffic to travel through.

Today's high-tech industry (e.g., semiconductor and EDA (Electronic Design Automation)) is consolidating, converging, and moving toward a service oriented industry. The technology products being developed by the enterprises in this industry are becoming extremely sophisticated, and the enterprises frequently require some form of collaboration from their eco-system partners and vendors. These enterprises typically place their valuable IP (Intellectual Property) and development resources behind layers of firewalls for protection. This security infrastructure, however, makes the legitimate access extremely difficult. As a result, the business suffers with poor productivity and long time to resolving technical and business oriented issues.

Thus, there is a need to provide systems and techniques to facilitate secure communications between two or more network domains.

BRIEF SUMMARY OF THE INVENTION

A secure virtual network platform connects two or more different or separate network domains. When a data packet is received at an end point in one network domain, a determination is made as to whether the data packet should be forwarded outside the virtual network platform, or transmitted via the virtual network to a destination in another network domain connected by the virtual network platform.

In a specific implementation, a secure virtual network platform that connects client-server applications for enterprise hybrid cloud computing environments is provided. The platform can provide one view to the applications running in segregated network domains with one unified virtual network and security. This secure virtual network platform is decoupled and independent from the physical network topology and security underneath. With this secure virtual network platform, the deployment and management of enterprise applications in a hybrid cloud environment is very easy.

In another specific implementation, a secure virtual network platform includes a remote access platform that allows enterprise users to securely access a remote cloud based virtual infrastructure and applications. The remote access platform includes a web service design along with a client control of access and debug solutions with an interlock technology. The interlock technology secures specified application software as being the only allowed software versions used and locked over this secure virtual network infrastructure. Various access and debug functions and features are able to take advantage of this secure network platform and the interlock technology. The net design is an end-to-end, secure, and novel platform for enterprise remote access, operation, debug, and collaboration.

In a specific implementation, a method includes receiving at a first end point in a first network domain a request to make a connection to a second end point, determining if the connection should be provided through a virtual network connecting the first network domain with a second network domain, separate from the first network domain, if the connection should be provided through the virtual network, establishing a virtual network connection between the first end point and the second end point, the second end point being in the second network domain, and if the connection should not be provided through the virtual network, passing the request outside the virtual network.

The passing the request outside the virtual network may include forwarding the request to a local TCP/IP network inside the first network domain. The passing the request outside the virtual network may include forwarding the request to a physical networking device inside the first network domain.

Determining if the connection should be provided through a virtual network connection may include comparing one or more than one Internet Protocol (IP) addresses associated with the second end point against a list of IP addresses stored at the first end point, where when the one or more than one IP addresses associated with the second end point are not listed in the list of IP addresses, the connection should not be provided through the virtual network.

In a specific implementation, the virtual network includes a first control daemon and a first virtual network proxy at the first end point in the first network domain, a second control daemon and a second virtual network proxy at the second end point in the second network domain, a virtual network switch coupled between the first and second network domains, and a controller coupled to the virtual network switch, and the first and second control daemons. The controller upon approving the virtual network connection instructs the first virtual network proxy via the first control daemon to establish a first connection of the virtual network connection to the virtual network switch, instructs the second virtual network proxy via the second control daemon to establish a second connection of the virtual network connection to the virtual network switch, and instructs the virtual network switch to allow the first connection from the first virtual network proxy, and to allow the second connection from the second virtual network proxy.

The first end point, second end point, or both may include at least one of a physical server, a virtual machine (VM), or a virtual network edge gateway.

In a specific implementation, the first end point includes a client component of an application program that issues the request, the second end point includes a server component of the application program, and the method includes computing an identifier of the application program, comparing the identifier with a predetermined identifier associated with a specific version of the application program, and if the identifier does not match the predetermined identifier associated with the specific version of the application program, determining that the connection should not be provided through the virtual network.

In a specific implementation, the first network domain is coupled to the second network domain via the Internet. The method may include storing a list identifying one or more specific application programs authorized to use the virtual network, determining that the request is from one of the one or more specific application programs authorized to use the virtual network, after the determination that the request is from a specific application program authorized to use the virtual network, seeking permission from a controller for the establishment of the virtual network connection, and receiving an indication that the connection should not be provided through the virtual network, the permission thereby being denied by the controller.

In a specific implementation, the establishing a virtual network connection between the first end point and the second end point includes creating at the first end point a first dynamic routing table having first routing information, the first routing information including a first session identifier for the virtual network connection, and forwarding the first routing information to a virtual network switch between the first and second network domains. The virtual network switch consults a second dynamic virtual routing table having second routing information, the second routing information a second session identifier. When the second session identifier matches the first session identifier, the virtual network switch forwards a payload of a data packet from the first end point to the second end point according to the second routing information.

In another specific implementation, a method includes storing a list identifying one or more specific application programs that are allowed to use a virtual network connecting a first network domain with a second network domain, different from the first network domain, receiving at a first end point in the first network domain a request from a client component of an application program to make a connection to a server component of the application program, determining from the list if the application program is one of the one or more specific application programs that are allowed to use the virtual network, if allowed, establishing for the application program a virtual network connection between the first end point and a second end point in the second network domain, the server component of the application program being at the second end point in the second network domain, and if not allowed, not establishing the virtual network connection.

One of the first or second network domains may include a private network domain, and another of the first or second network domains may include a public network domain. One or more specific application programs may include at least one of a GDB Debug Application, a VNC Access and Collaboration Application, or a Zshell Secure Access Application.

In a specific implementation, the virtual network includes a virtual network switch connected between the first and second network domains, and a virtual routing table. The virtual network switch receives a data packet from the first end point, and based on the virtual routing table, forwards a payload in the data packet to the second end point in the second network domain.

The method may include comparing an identifier associated with the application program to the list identifying the one or more specific application programs are allowed to use the virtual network, if the identifier associated with the application program matches an identifier in the list, determining that the application program is one of the one or more specific application programs that are allowed to use the virtual network, and if the identifier associated with the application program does not match an identifier in the list, determining that the application program is not one of the one or more specific application programs that are allowed to use the virtual network, and passing the request to a local TCP/IP network inside the first network domain.

In a specific implementation, establishing for the application program a virtual network connection includes creating at the first end point a first dynamic routing table having first routing information, the first routing information including a first session identifier for the virtual network connection, and forwarding the first routing information to a virtual network switch between the first and second network domains. The virtual network switch consults a second dynamic virtual routing table having second routing information. The second routing information includes a second session identifier. When the second session identifier corresponds to the first session identifier, the virtual network switch forwards a payload of a data packet from the client component to the server component according to the second routing information.

In another specific implementation, a method includes storing at a first end point in a first network domain a static routing table including a list of virtual destination Internet Protocol (IP) addresses, receiving at the first end point a request from a client to connect to a destination, scanning the static routing table to determine whether an IP address of the destination is listed in the static routing table, if the IP address is not listed, passing the request to a TCP/IP network that is local to the first network domain, if the IP address is listed, seeking permission to use a virtual network connecting the first network domain to a second network domain, different from the second network domain, the destination being in the second network domain, and upon a determination that use of the virtual network is permitted, establishing for the client a virtual network connection between the first end point and the destination.

The method may further include upon the determination that use of the virtual network is permitted, creating at the first end point a first dynamic routing table having first routing information, the first routing information including a first identifier that identifies the virtual network connection, and forwarding the first routing information to a virtual network switch between the first and second network domains, where the virtual network switch consults a second dynamic virtual routing table having second routing information, the second routing information comprising a second identifier, where when the second identifier corresponds to the first identifier, the virtual network switch forwards a payload of a data packet from the client to the destination according to the second routing information.

In a specific implementation, the second dynamic virtual routing table is provisioned by a controller after the controller determines that use of the virtual network is permitted.

In a specific implementation, the virtual network includes a controller that grants or denies permission to use the virtual network. When the controller grants permission to use the virtual network, the controller provisions an entry in a dynamic virtual routing table at a virtual network switch between the first and second network domains. The entry includes a virtual IP address associated with the client, a virtual IP address associated with the destination, and a session identifier for the virtual network connection.

Other objects, features, and advantages of the present invention will become apparent upon consideration of the following detailed description and the accompanying drawings, in which like reference designations represent like features throughout the figures.

BRIEF DESCRIPTION OF THE FIGURES

FIG. 14 shows a flow diagram for discovering a new end point in a network domain.

FIG. 15 shows a flow diagram for discovering a deleted end point in a network domain.

DETAILED DESCRIPTION

Figure 1:
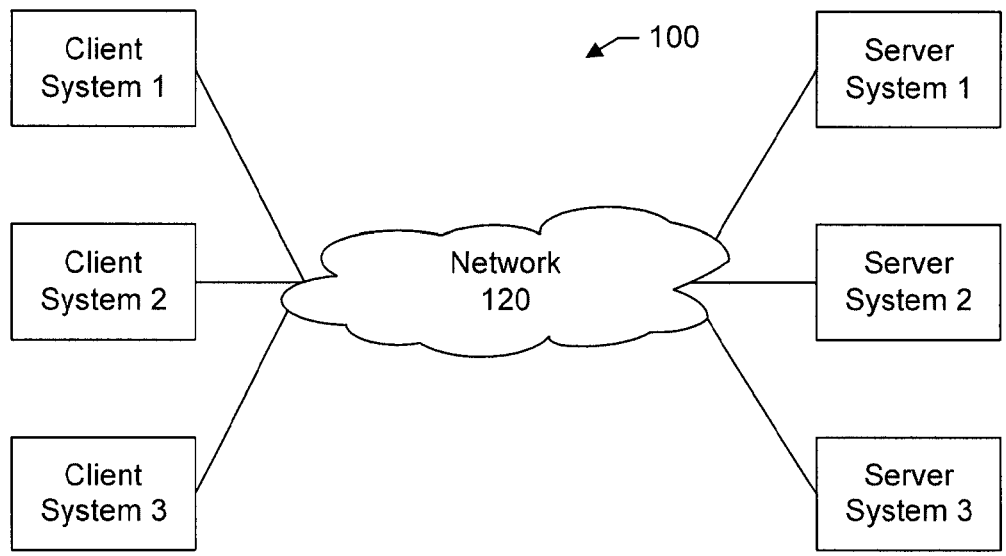
FIG. 1 shows a computer network system within which the present invention may be embodied.

FIG. 1 shows a computer network system 100 within which the present invention may be embodied. There may be any number of servers and clients in the system. For example, there may be hundreds, thousands, or even millions of servers and clients. In this system, there are three servers, server 1, server 2, and server 3, and there are three clients, client 1, client 2, and client 3. The client and server can represent application software. The hardware machine can be but is not limited to a server host machine or any type of client hardware machines such as desktop PC, laptop, and mobile devices. The servers communicate with the clients by exchanging packets over a network 120. The computer network system is representative of many different environments including a LAN (local area network) system, a wide area network (WAN) system, an Internet system, Ethernet, computer network, intranet, cellular phone network, or other.

Distributed computer network 100 in FIG. 1 is merely illustrative of an embodiment and is not intended to limit the scope of the invention as recited in the claims. One of ordinary skill in the art would recognize other variations, modifications, and alternatives. Client systems typically request information from server systems which provides the information. For this reason, server systems typically have more computing and storage capacity than client systems. However, a particular computer system may act as both a client or a server depending on whether the computer system is requesting or providing information.

Additionally, although some aspects of the invention are described using a client-server environment or client-server application program, it should be apparent that the invention may also be embodied in any environment where one system communicates with another system over a network. For example, in a hybrid cloud environment, there can be servers implementing the "client software" and other servers implementing the "server software." Those servers communicate with each other across cloud domains. The communication can be facilitated via a virtual network platform as discussed in this patent application.

As another example, there can be an access application where a "client machine" for a user is accessing servers in the "cloud." In this case, using GDB (GNU Debugger) as an example, the client software is then running on the client user machine. This client GDB software may to connect to the server GDB software that is running on the "server" in the cloud. The connection can be facilitated via a virtual network platform as discussed in this patent application.

A network generally includes: (1) at least two computers, (2) a network interface or network interface card (NIC) on each computer, (3) a connection medium, and (4) network operating system software. The NIC is a device that lets the computer talk to the network. The connection medium is usually a wire or cable, although wireless communication between networked computers and peripherals is also available. Some examples of network operating systems software include Microsoft Windows 7 or Windows Server 2012, Linux Red Hat 5, Ubuntu 13, Novell NetWare, AppleShare, or Artisoft LANtastic.

A network may include a hub, switch, or router. Hubs interconnect groups of users. Hubs can forward data packets—including e-mail, word-processing documents, spreadsheets, graphics, print requests—they receive over one port from one workstation to all their remaining ports.

Switches can offer more dedicated bandwidth to users or groups of servers. A switch can forward a data packet only to the appropriate port for the intended recipient, based on information in each packet header. To insulate the transmission from the other ports, the switch establishes a temporary connection between the source and destination, and then terminates the connection when the conversation is done.

A router links a local network to a remote network. On the internet, a router is a device or, in some cases, software in a computer, that determines the next network point to which a packet should be forwarded toward its destination. The router is connected to at least two networks and decides which way to send each information packet based on its current understanding of the state of the networks it is connected to. A router is located at any gateway (where one network meets another), including each Internet point-of-presence. A router is often included as part of a network switch.

Figure 2:
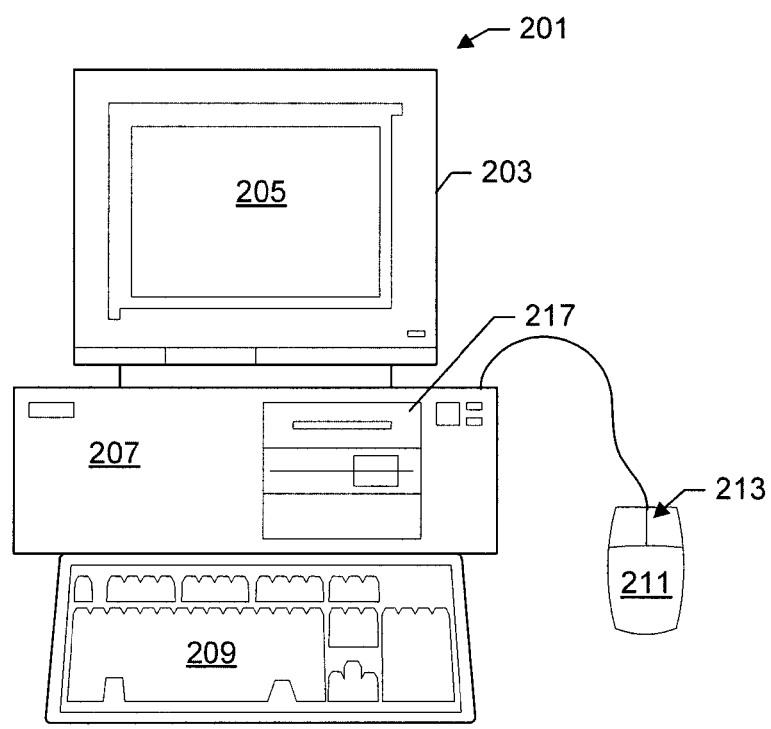
FIG. 2 shows a more detailed diagram of an example of a client or computer which may be used in an implementation of the invention.

FIG. 2 shows an example of a client or server system that may be used to execute software of the present invention. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
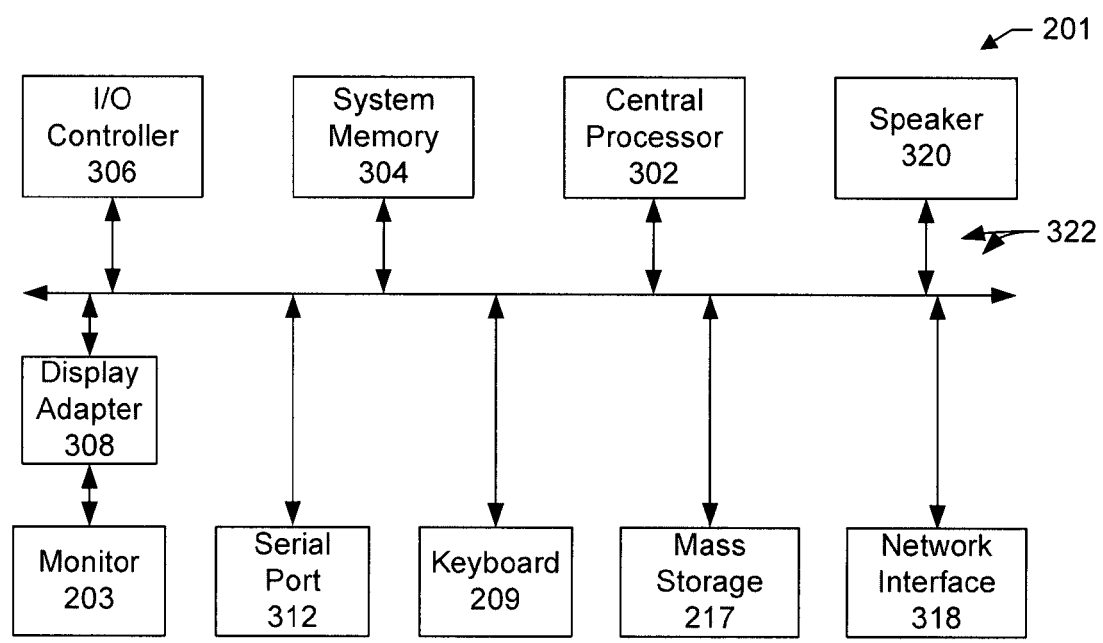
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows Server 2008, 2012, Windows NT®, Windows 2000®, Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
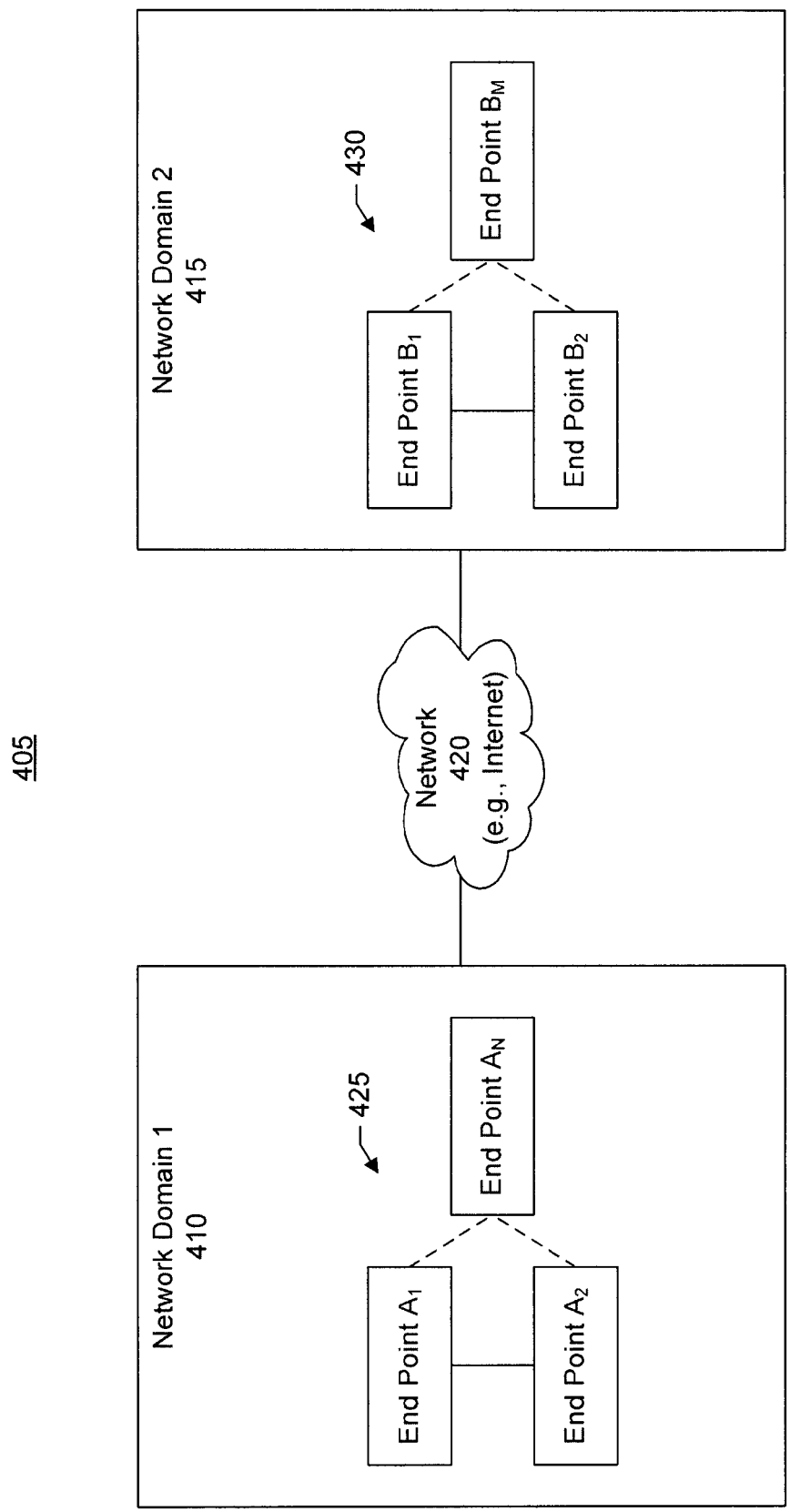
FIG. 4 shows a block diagram of end points within two network domains.

FIG. 4 shows a simplified block diagram of a distributed computing environment 405 in which a virtual network platform may be implemented. This environment includes a first network domain 410, a second network domain 415, and a network 420 that connects the first and second network domain. The first network domain includes a first set of end points 425 (e.g., end point $A_1$, end point $A_2$, ... end point $A_n$). The second network domain includes a second set of end points 430 (e.g., end point $B_1$, end point $B_2$, ... end point $B_m$). The end points in a network domain may be interconnected themselves such as through a network or local network.

The network may be as shown in FIG. 1. An end point may be referred to as a node or computing node. In a specific embodiment, the first and second network domains are separate and interconnected via the Internet. One of the first or second network domains may include a private cloud infrastructure. Another of the first or second network domains may include a public cloud infrastructure. In this specific embodiment, the architecture shown in the example of FIG. 4 may be referred to as a hybrid cloud.

Security in a hybrid cloud environment is a concern because the underlying network and infrastructure are distributed, segregated, and owned by multiple authorities. Coordination among all parties for security re-provisioning can be overwhelming and prohibited, even if the change request is driven by a validated and approved business case. In a specific implementation, systems and techniques are provided for a secure virtual network platform that connects client and server applications deployed in two (or more) separate network domains interconnected via the Internet.

A network domain may include any number of end points. For example, there can be hundreds, thousands, or even millions of end points. An end point may include a physical device, a virtual device, or both. An end point can include a physical server (e.g., blade servers or rack-mounted servers), a virtual machine (VM), a virtual network edge gateway, or other physical or virtual appliance.

More particularly, an end point may include a general purpose computing system having one or more components such as that shown in FIGS. 2-3. For example, an end point may include a user interface, one or more processors, a network interface, mass storage, and memory. Alternatively, some embodiments may not include the user interface or the user interface may not be connected directly to the hardware platform. For example, user interaction may be automated or occur remotely in connection with data center administration. A first end point can include a client. A second end point, remote from the first end point, can include a server. The server may host application services for the client.

In a virtual machine environment, the hardware platform may be referred to as a host, host machine, or host computer. The host uses the virtualization software to run the virtual machines or virtual devices. Generally, virtualization is an abstraction layer that allows multiple virtual environments to run in isolation, side-by-side on the same physical machine. A virtual machine (VM) is a software implementation of a machine (e.g., a computer) that executes programs like a physical machine. In other words, the virtual machine is a software abstraction of a physical computer system that is installed as a "guest" on the "host" hardware platform.

A virtual machine can include a guest operating system, guest applications running on the guest operating system, and virtual hardware which represents a hardware state of the virtual machine. The virtualization software may include a hypervisor or virtual machine monitor (VMM) that presents the guest operating system with a virtual operating platform. Virtual hardware refers to the hardware resources allocated to the virtual machine and is mapped to the hardware platform. The virtual hardware may include virtual disks, virtual processors, virtual system memory, and various virtual devices for which the guest operating system includes corresponding drivers. A host hardware platform may host multiple virtual machines. Each virtual machine may be assigned an identifier such as an internet protocol (IP) address.

An end point including a virtual network edge gateway provides a network entry point to services or applications behind the gateway. For example, an edge device can connect an internal local area network to the virtual network.

A network domain can be enterprise local area network (LAN), server farm environment, or an Infrastructure as a Service (IaaS) cloud datacenter, which can be protected by conventional peripheral firewalls. The two network domains can be interconnected via Internet or any TCP/IP network.

In an embodiment, the first network domain is different or separate from the second network domain. For example, the domains may be in different physical or geographic locations, have different capabilities, have different computer architectures, have different network environments, have different physical devices, networking infrastructure may be owned, operated, and administered by different entities, companies, enterprises, authorities, parties, or organizations, have different administrative policies, have different storage policies, have different security policies, or combinations of these.

Both domains may be owned by the same enterprise, but may be in different geographic locations. For example, one domain may be in San Francisco. Another domain may be in London. As another example, one domain or networking infrastructure may be privately owned such as by an enterprise. Another domain or networking infrastructure may be owned by a different or third-party that leases computing resources to the enterprise. A domain may be or be a part of a cloud computing or multi-tenant data center. There can be multiple private domains. There can be multiple public domains.

In a specific embodiment, the first and second domains are connected by the Internet. The Internet is a global system of interconnected computer networks that use the standard Internet protocol suite (TCP/IP) to serve users worldwide. It is a network of networks that includes millions of private, public, academic, business, and government networks, of local to global scope, that are linked by a broad array of electronic, wireless, and optical networking technologies.

In a specific embodiment, one of the first or second domains is a private cloud. Another of the first or second domains is a public cloud. A private cloud refers to a computing infrastructure (e.g., hardware, software, or both) that may be operated, controlled, or owned by a single enterprise. The computing infrastructure is internal to the enterprise. A public cloud refers to a computing infrastructure in which services are rendered over a network that is open for public use (e.g., Internet). The public cloud can offer on-demand network access to a shared pool of configurable computing resources (e.g., networks, servers, storage, applications, and services).

Some characteristics of a public cloud include on-demand self-service (e.g., consumer can unilaterally provision computing capabilities such as server time and network storage), resource pooling (e.g., the provider's computing resources are pooled to serve multiple consumers using a multi-tenant model, with different physical and virtual resources such as storage, processing, memory, and network bandwidth dynamically assigned and reassigned according to consumer demand), elasticity (e.g., capabilities can be elastically provisioned and released to scale outward and inward based on demand), and metering (e.g., resource usage can be monitored and reported for billing).

Some examples of cloud computing service providers include Amazon Web Services (AWS), Microsoft Azure, HP Public Cloud, IBM SmartCloud, and many others. The number of computing end points in a private network domain for an enterprise may be different from the number of computing end points in a public cloud network domain. For example, the enterprise may include several thousand end points. The public cloud may include hundreds of thousands or millions of end points.

In this specific embodiment, the computing architecture may be referred to as a hybrid cloud. A hybrid cloud is a composition of two or more clouds such as a private cloud and a public cloud. A hybrid cloud allows an enterprise to extend its computing capabilities without having to make large capital investments in assets such as physical space and computing hardware. A hybrid cloud can also be used by an enterprise to accommodate spikes in demands for computing resources. An organization can pay for computing resources when they are needed. The organization may have a rental, lease, or other contractual agreement with a cloud services provider for the computing resources. An organization may utilize the services of multiple cloud service providers.

As discussed above, however, security and the network connection in a hybrid cloud environment is a concern because the underlying network and infrastructure are distributed, segregated, and owned by multiple authorities. Each authority may have different approaches and practices regarding security, privacy, administration, and compliance.

Figure 5:
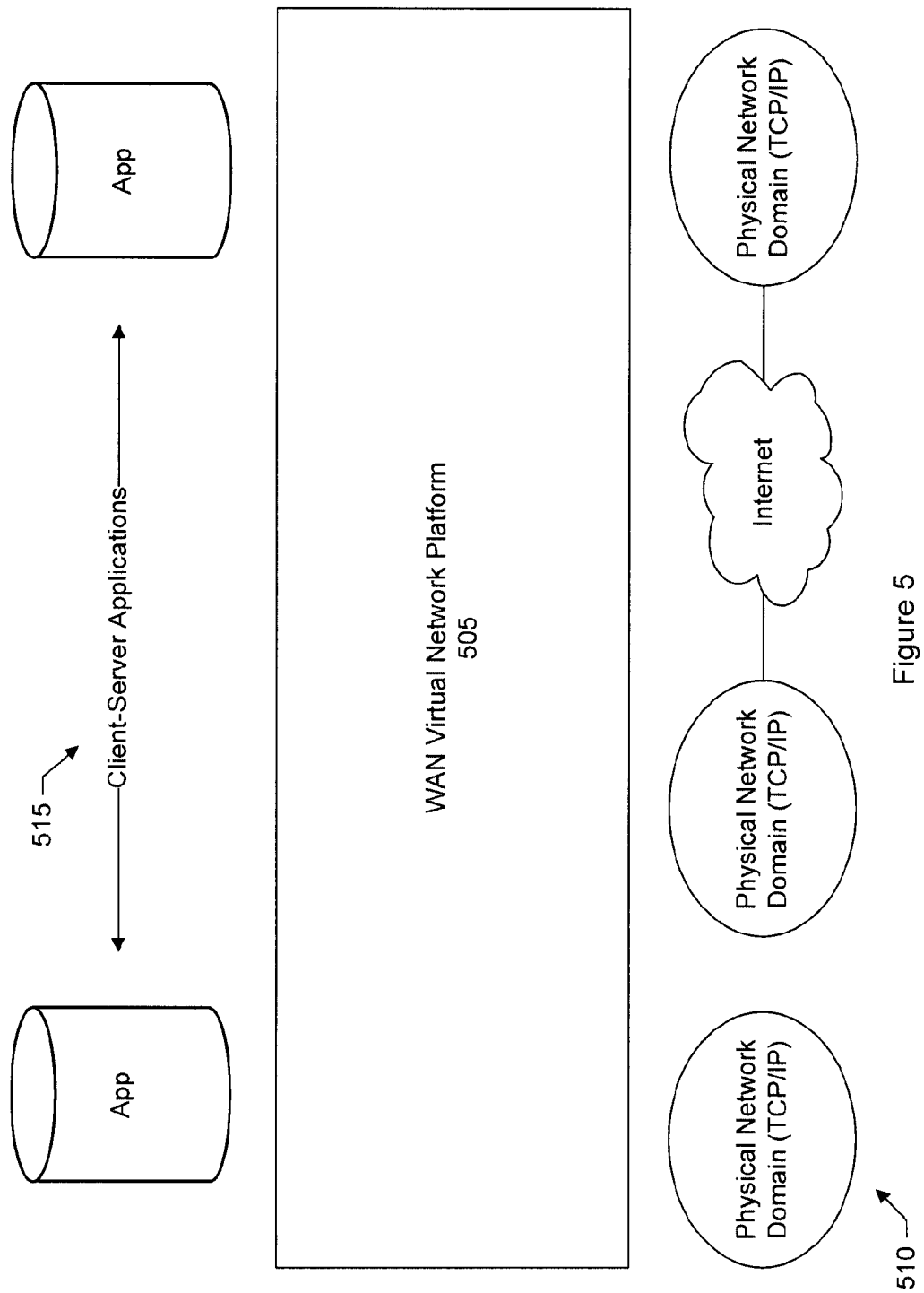
FIG. 5 shows a block diagram of a secure virtual network platform connecting the two or more network domains.

FIG. 5 shows a simplified block diagram of a secure virtual network platform or system 505. The virtual network platform may be referred to as a software-defined network (SDN), however, this SDN is not limited to an enterprise LAN (Local Area Network) or a local network in a cloud datacenter only. It is a WAN (Wide Area Network) based virtual network platform that is across multiple network domains. In a specific embodiment, the virtual network platform connects different physical network domains 510 in a hybrid cloud environment. The virtual network platform may be referred to as a wide area virtual network because it goes across or connects different network domains. As shown in the example of FIG. 5, the virtual network platform is layered on top of the physical network domains. The physical network domains may be running TCP/IP (Transmission Control Protocol/Internet Protocol). TCP/IP is one of several protocols that operating systems can use to process application requests for transmission over a network. The physical network domains may be controlled by different groups or IT departments.

Applications, such as client-server applications 515, are layered on top of the virtual network platform. In other words, the virtual network platform is positioned between the applications and the network domains. The applications can use the services provided by the virtual network platform to send and receive information across different domains. The virtual network platform helps to isolate the applications from the complexity of transmitting and receiving data across the different network domains.

For example, a client-server application may include a client application component and a server application component. The client application component may be executing on a first end point in a first network domain. The server application component may be executing on a second end point in a second network domain. The second network domain may be separate, remote, or different from the first network domain. In a specific implementation, the client application component can be a web browser. A client web browser requests an action or service from the provider of service (e.g., server or web server). In another specific implementation, the client application component executes independently of the web browser, such as an email client that connects to an email server.

When appropriate, the virtual network platform can be used to securely communicate or exchange information (e.g., data packets) between the network domains. For example, depending on the source of a particular data packet, destination of a particular data packet, security policy, application program, or combinations of these, it may or may not be appropriate to use the virtual network for the transport.

Figure 6:
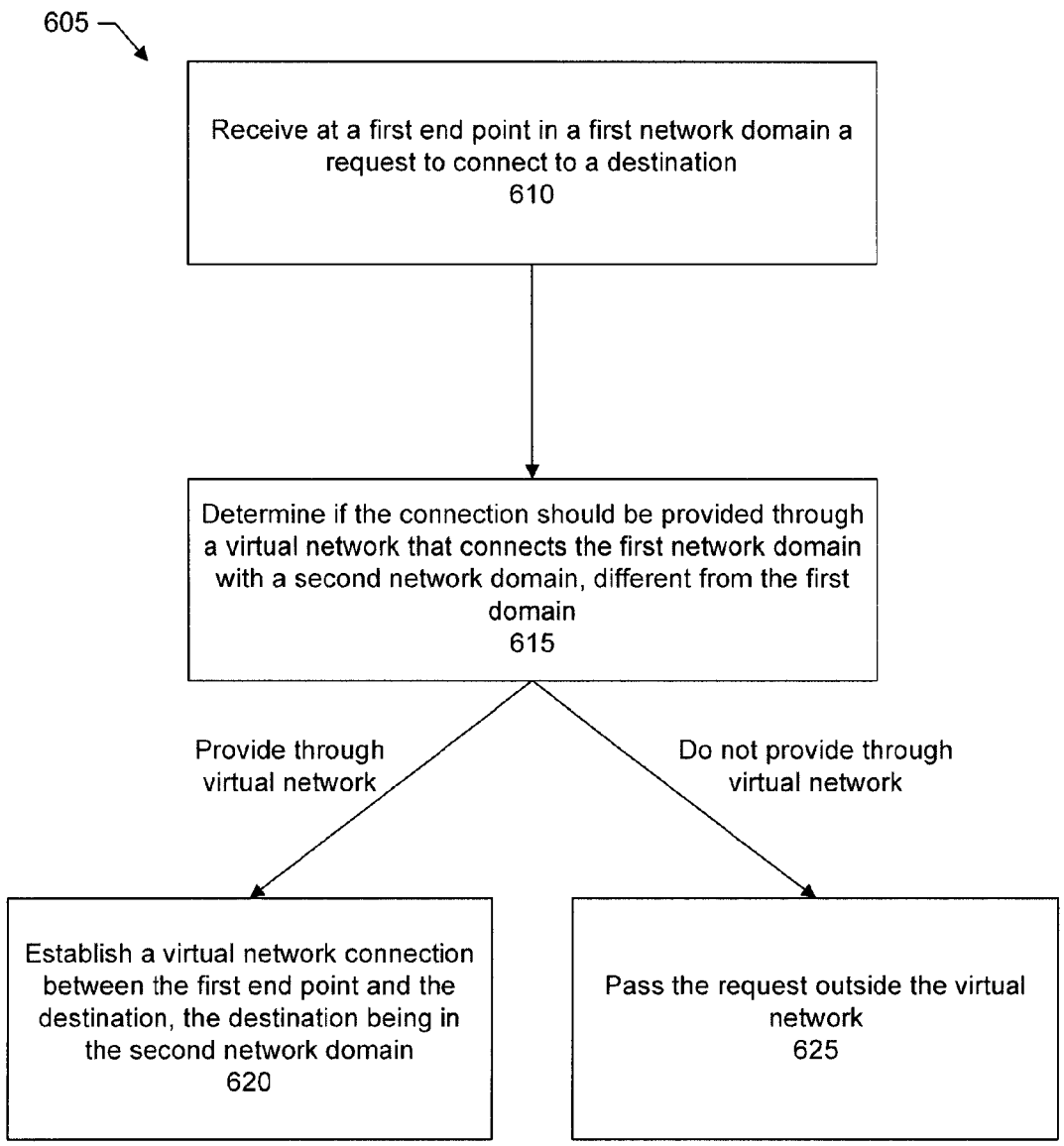
FIG. 6 shows an overall flow diagram for the virtual network platform.

FIG. 6 shows an example of an overall flow 605 for a specific implementation of the virtual network platform. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In a step 610, a data packet (e.g., request) is received at a first end point in a first network domain to be sent to a destination. The data packet can indicate a request to connect to the destination. In a specific implementation, the request is from a client application component of an application program to connect with a server component of the application program.

It should be appreciated, however, that the request or connection can involve any type of source in one domain connecting to any type of destination in another domain and vice-versa. For example, in a hybrid cloud environment, there are servers implementing the "client software" and other servers implementing the "server software." The virtual network platform facilitates the servers communicating with each other across cloud domains. In another specific implementation, there is an access application where a "client machine" for a user is accessing servers in the "cloud." In this case, using GNU Debugger (GDB) as an example, the client software is then running on the client user machine. This client GDB software can connect to the server GDB software that is running on the "server" in the cloud.

In a step 615, a determination is made as to whether the connection should be provided through a virtual network that connects the first network domain with a second network domain, different or separate from the first network domain.

In a step 620, if the connection should be provided through the virtual network, a virtual network connection is established between the first end point in the first network domain and the destination, the destination being at a second end point in the second network domain.

Alternatively, in a step 625 if the connection should not be provided through the virtual network, the data packet is passed outside the virtual network. In other words, the data packet may be forwarded to a destination outside or external to the virtual network. In a specific implementation, the data packet is passed to the local TCP/IP network inside the first network domain. The local TCP/IP network can include a physical networking device (e.g., hardware router or hardware switch) within the first network domain. The physical networking device may include its own set of rules and logic for processing and forwarding the data packet. These rules and logic are separate from or independent of the rules and logic of the virtual network platform.

In a specific implementation, the decision as to whether the virtual network should be used can be made locally or without traversing the virtual network. For example, the decision can be made within the originating domain (e.g., the first domain). This feature helps to conserve the computing resources of the virtual network, reduce network traffic across the virtual network, and prevent bottlenecks. The virtual network platform provides IT administrators with the flexibility to decide the conditions, circumstances, or contexts for when the virtual network should be used (or not be used) to transmit data across two or more network domains. For example, the administrator can use the system to control which applications will use the virtual network, which applications will not use the virtual network, or both.

In a specific implementation, the system stores a list of applications that are authorized or allowed to use the virtual network. This list may be referred to as a white list. In various other specific implementations, the system stores a list of applications that are not authorized or allowed to use the virtual network. This list may be referred to as a black list. In a specific implementation, an application not listed in the black list is allowed to use the virtual network.

Figure 7:
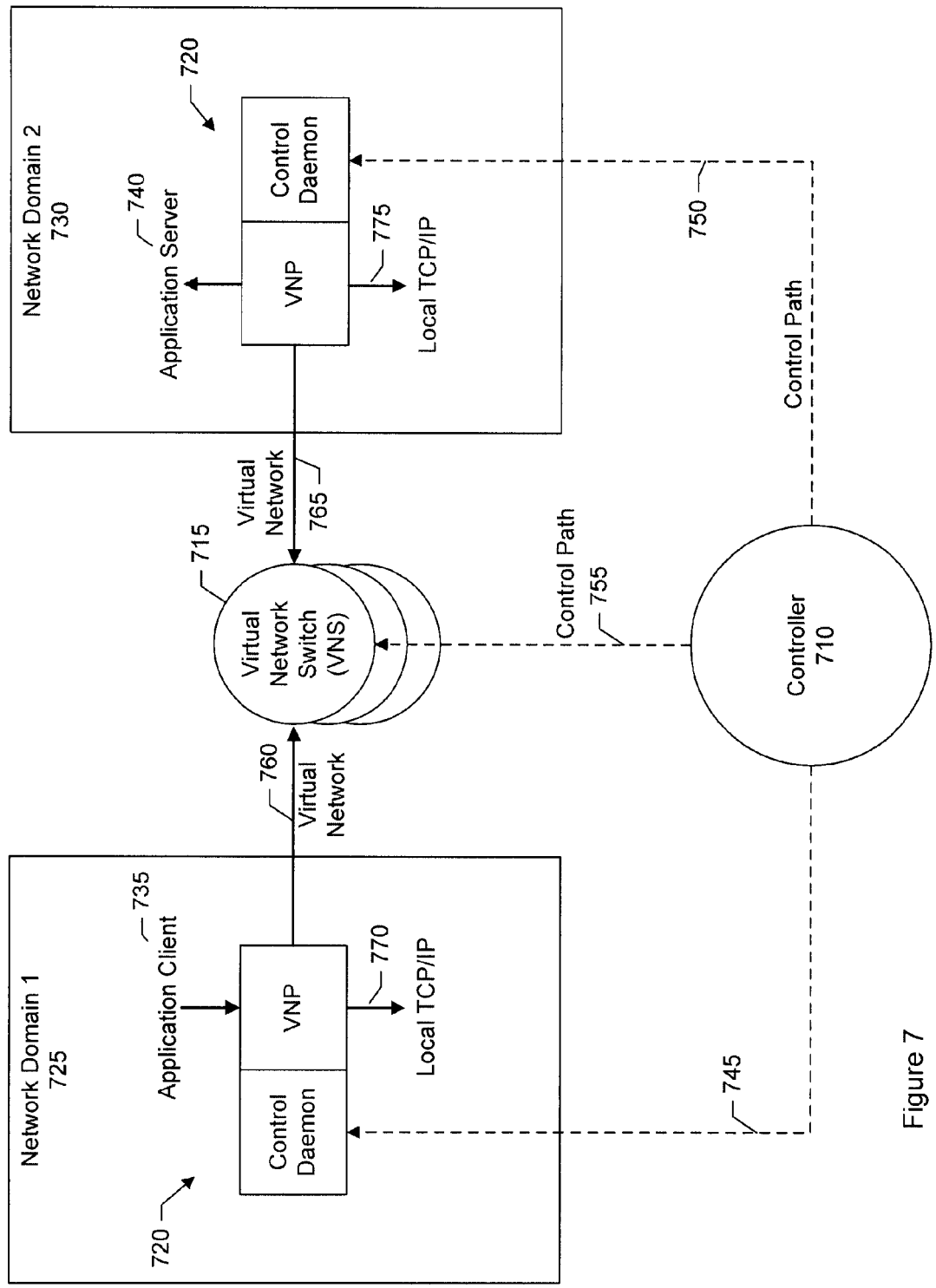
FIG. 7 shows a block diagram of a secure virtual network with L4 control paths.
Figure 8:
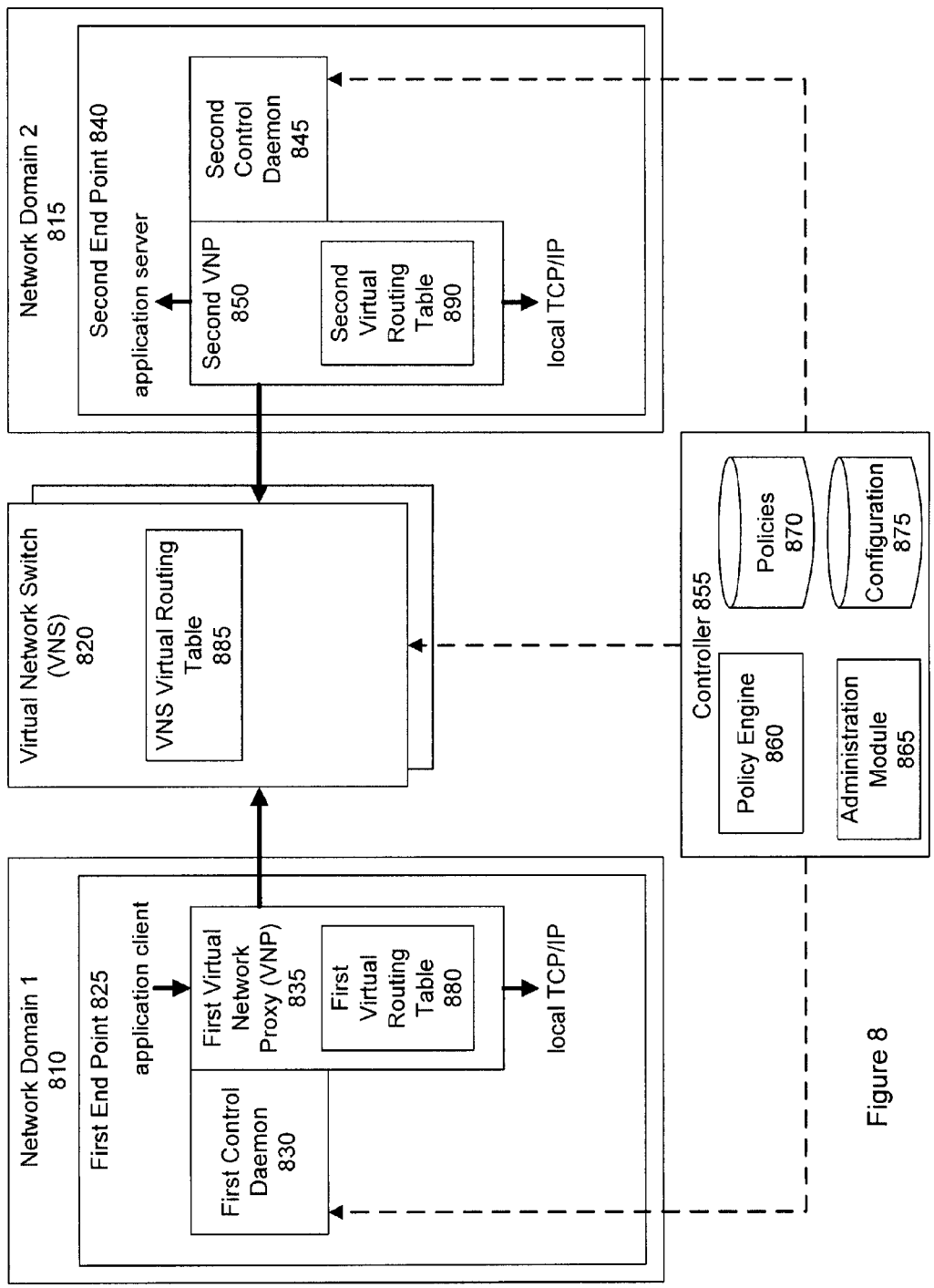
FIG. 8 shows a more detailed block diagram of the secure virtual network platform including virtual routing tables.

FIGS. 7 and 8 show more detailed block diagrams of the virtual network platform shown in FIG. 6. Referring now to FIG. 7, in a specific implementation, this secure virtual network platform design features a central controller 710, a virtual network switch (VNS) 715, and various end point modules 720 to form an end-to-end closed virtual network system. The controller, switch, and modules can include executable code, code components, or logic stored in memory of a hardware component.

In a specific implementation, the central controller is responsible for implementing and maintaining security policies in a central database, evaluating the security policies, approving (or denying) virtual network connections, directing the virtual switches to allow (or block) the virtual network connections, and directing the virtual network proxies to establish connections to the virtual switches. A specific example for such a security policy can be a rule for a GDB server application that is running on certain server machines in a network domain which can be accessed by a certain group of client machines running the GDB client software in a different network domain.

The virtual network switches are responsible for switching operations such as receiving a data packet and forwarding the data packet to the appropriate end point or port for the intended recipient. The virtual network switches can act as a bridge for exchanging communication between two different components of an application (e.g., a client component and a server component), where the application components are on two different end points in two different or separate network domains. Each network domain can remain independently configured. A virtual switch may execute within the virtualization software or firmware of a hardware component.

In a specific implementation, an end point module includes a control daemon and virtual network proxy. The control daemon, virtual network proxy, or both may be referred to as a virtual network agent. In a specific implementation, the end point modules are independent application programs or code modules. The modules may be external to the end point OS. A module may include code that is not native to the OS. In another specific implementation, the modules may function at the OS level or may be part of the OS. That is, a module may be internal to the OS. A module may include code that is native to the OS. A module may be implemented via add-ins, plug-ins, scripts, macros, extension programs, libraries, filters, device drivers, or combinations of these. Further discussion is provided below.

FIG. 7 shows a design with L4 (OSI layer 4) control paths between components that assure a tight security control for the use of the virtual network platform. The OSI (Open Systems Interconnection) Reference Model divides the functionality of the networking process into a seven-layer structure. The layers from top to bottom include application, presentation, session, transport, network, data link, and physical. The TCP/IP protocols are also divided into layers representing some of the same processes as their counterparts in the OSI model. There are four layers of the TCP/IP stack including application, transport, Internet, and link. The transmission of data from a source computer to a destination computer involves passing a request down through the various layers of the protocol stack.

The end point modules in a first network domain (e.g., network domain 1) 725 and a second network domain (e.g., network domain 2) 730 each include a virtual network proxy (VNP) and a control daemon connecting to the central controller. As discussed above, an example for an end point can be a physical server or a VM (virtual machine). Another example can be a virtual network edge gateway. In this specific implementation, a VNS is also or always connected to the controller. The network domain can be an enterprise LAN, server farm environment, or IaaS cloud datacenter, which can be protected by conventional peripheral firewalls. The two network domains can be interconnected via Internet or any TCP/IP network.

In a specific implementation, the enterprise IT defines a virtual routing table in the controller that defines how a client application 735 can find a server application 740 in a hybrid cloud environment. A set of virtual IP addresses is defined to connect a particular client-server application. This table is defined in the controller and the detail information is then pushed 745 and 750 to all control daemons and implemented in the VNPs.

In this specific implementation, when the application client software is making a connection to the application server in a separate network domain (e.g., the second network domain) in a hybrid cloud environment, it follows a TCP/IP routing table and requests a TCP connection with the VNP on the client side. The VNP confirms with the virtual routing table and then requests the control daemon to set up a virtual network connection.

The control daemon then makes the request to the central controller. The central controller checks the security policy, approves the connection, and then informs 755 VNS to allow virtual network connections 760 and 765 from both VNPs, respectively, and switch the packets. Once receiving the confirmation from the VNS, the controller requests both VNPs (via the control daemon) to establish a virtual network connection to VNS. The VNPs will then operate or function as a TCP proxy for data transfer. The VNS switches the data sent/received from the two virtual network connections.

In an implementation, the VNS only accepts virtual network connections when it is requested by the central controller for security control. The connections are always in pairs. When one connection is terminated by a VNP, the VNS will terminate the other virtual network in the same pair. In an implementation, the virtual network is always encrypted to protect the data transport.

The VNPs work as a TCP proxy and reverse proxy for the traffic defined in the virtual routing table. For the traffics not defined in the virtual routing table (i.e., traffic not using secure virtual network), the VNP will pass 770 and 775 the packets to the local TCP/IP network inside the respective network domain.

In an implementation, the virtual network connection (e.g., a TCP connection) is always initiated by the VNP at an end point to the central VNS. The data is then switched in the VNS. This architecture design is suitable for most of the TCP/IP network and peripheral firewall implementations in enterprise legacy networks. This architecture design allows the secure virtual network provisioning to be decoupled from the physical network and firewalls underneath and helps to avoid changing any legacy infrastructure. More specifically, the VNP initiates TCP traffic to the VNS, as this direction follows the typical enterprise firewall rules of "outbound first, inbound reply."

In a specific implementation, the virtual network switch (VNS) operates as a switching mechanism between the first and second network domains. In this specific implementation, the VNS can remove or extract a payload received from the first virtual network proxy in the first network domain and place the payload into return traffic to the second virtual network proxy in the second network domain.

The architecture of the virtual network platform allows the platform to be deployed without having to make extensive changes to the underlying network layer such as the legacy or exiting security firewall settings. For example, typically, as discussed an enterprise's firewall setting will allow outbound traffic to a destination gateway and then an inbound return. The virtual network switch between the domains provides an outbound traffic destination for end points in the first network domain, and an outbound traffic destination for end points in the second domain. This helps to reduce or eliminate the need for an enterprise to change their existing firewall settings. A new security policy can be implemented in the virtual network layer via the controller 710 as an easy add-on layer to the enterprise legacy network.

In other words, for many enterprises outbound traffic is allowed. The returning traffic for inbound is also allowed. The inbound first traffic is typically blocked by the corporate firewall for the reasons of protecting the corporate networks. That is, an enterprise may block unsolicited inbound traffic. The system architecture design shown in FIG. 7 recognizes such corporate firewall system policies by having the VNPs initiate outbound connections to the VNS for the establishment of a virtual network connection. An enterprise wishing to implement the virtual network platform will not have to make many changes to the corporate firewall because many corporate firewalls, while blocking unsolicited inbound traffic, will allow outbound network traffic and the subsequent inbound traffic associated with the outbound connections, e.g., return, response, or reply traffic.

In a specific implementation, a method for establishing a virtual connection between a first end point in a first network domain and a second end point in a second network domain, different from the first network domain, includes instructing a first virtual network proxy at the first end point to initiate a first connection outbound to a virtual network switch between the first and second network domains, the first connection thereby being outbound network traffic to the virtual network switch, instructing a second virtual network proxy at the second end point to initiate a second connection outbound to the virtual network switch, the second connection thereby being outbound network traffic to the virtual network switch, receiving at the virtual network switch a data packet from the first end point for the second end point, and forwarding a payload of the data packet to the second end point as return traffic associated with the second connection.

In another specific implementation, a method for establishing a virtual network connection between a first end point in a first network domain and a second end point in a second network domain, different from the first network domain, includes initiating or making a first connection from the first end point to a virtual network switch between the first and second network domains, initiating or making a second connection from the second end point to the virtual network switch, the second connection thereby including an outbound request from the second end point to the virtual network switch, receiving at the virtual network switch a data packet from the first end point via the first connection, and forwarding a payload of the data packet to the second end point as a response to the outbound request.

In another specific implementation, a method includes receiving at a virtual network switch between first and second network domains a data packet from the first end point, receiving at the virtual network switch outbound traffic from the second end point, and forwarding a payload of the data packet as return traffic associated with the outbound traffic.

In another specific implementation, the end points also always initiate the control traffic, connecting to the central controller. Again, a reason is because corporate firewalls typically block inbound traffics and allow outbound traffic and the inbound return traffic. The "control path" is designed for such firewalls in that the end points always initiate the control traffic to the central controller to avoid any corporate firewall issue. When the controller is communicating with the second end point, asking it to initiate a traffic to the VNS, the controller is using the "return traffic" to talk to the second end point (since the second end point initiates the traffic to the controller first).

In a hybrid cloud environment, the virtual routing table can be dynamically updated when end points are added to or deleted from the virtual network. The updated virtual routing table will be pushed by the controller to each involved control daemon and then implemented in each VNP.

FIG. 8 shows a more detailed diagram of a specific implementation of a virtual network platform. As shown in the example of FIG. 8, there is a first network domain 810, a second network domain 815, and a virtual network switch 820 between the first and second network domains. The first network domain includes a first end point 825. The first end point includes a first control daemon 830 and a first virtual network proxy 835.

Similarly, the second network domain includes a second end point 840. The second end point includes a second control daemon 845 and a second virtual network proxy 850. There is a controller 855 that is connected to the virtual network switch, and first and second control daemons. The controller includes a policy evaluation engine 860, an administration module 865, a database 870 for storing security policies, and a database 875 for storing configuration data. The VNPs and VNS include virtual routing tables for filtering and routing data packets between the two network domains. Further discussion is provided below.

Figure 9:
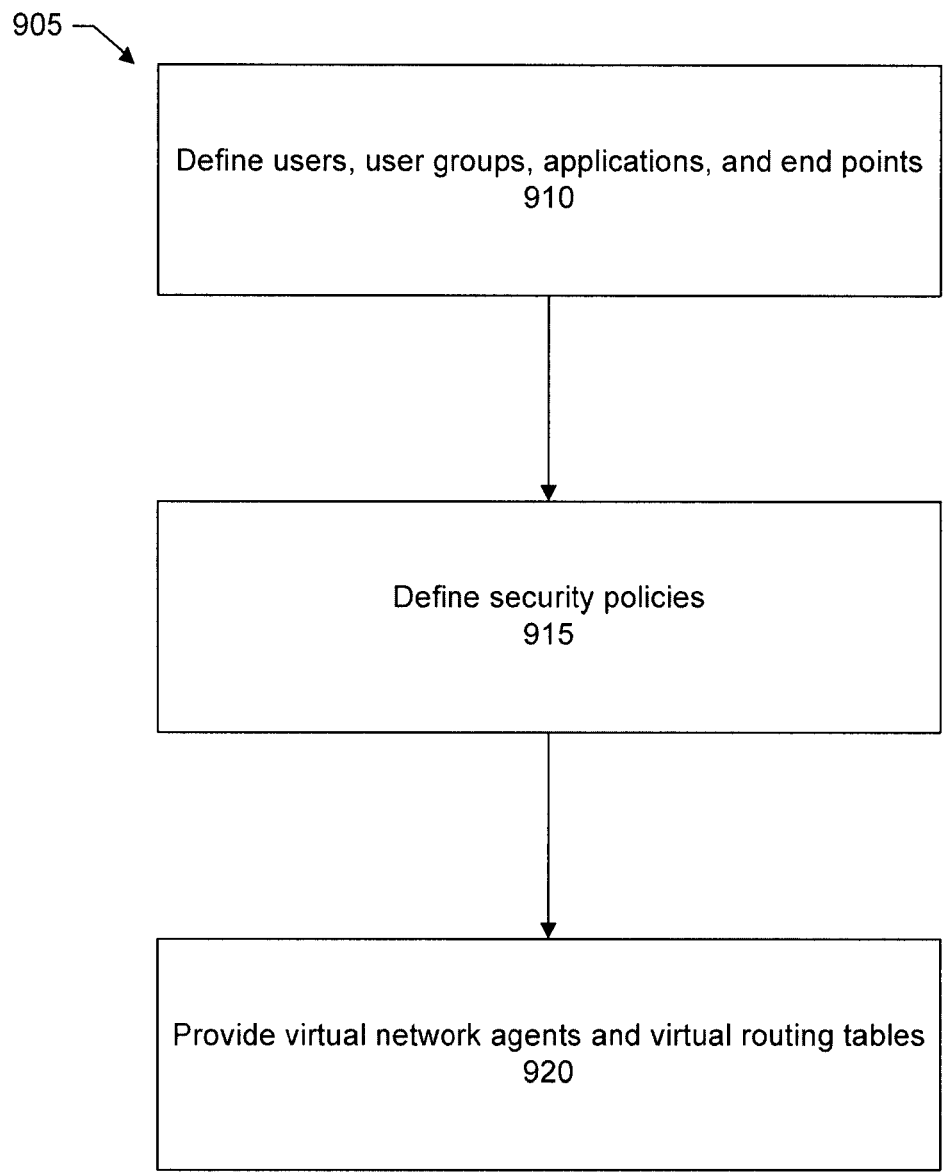
FIG. 9 shows a flow diagram for configuring the secure virtual network platform.

FIG. 9 shows a flow 905 for configuring a specific implementation of the virtual network. In this specific implementation, an IT administrator will program the central controller to define users and user groups (therefore, their computer (e.g., laptop computer) will automatically become end-points when they are on the computer and log in to the system), and the servers or VMs that are running some enterprise applications for access on the virtual network platform. And then the administrator will define the access rules (security) for who can access what, in what circumstances, and running what applications (e.g., what specific servers that have loaded these applications). Once these security rules are defined, users (e.g., their client computers as end-points) will be able to use the virtual network platform to securely access provisioned applications running on other end-points in segregated network domains.

More particularly, in a step 910, the IT administrator uses the administration module of the controller to define users, user groups, applications, and end points. The definitions may be stored in a configuration file or database. The administration module may include a graphical user interface (GUI) so that the administrator can easily manage the system. Using the administration module, an administrator can identify, create, add, update, delete, modify, alter, and remove users, groups, applications, and end points for the virtual network.

Table A below shows an example listing of users that may be defined through the administration module.

TABLE A

| Name | User Name |
|---|---|
| John Kent | jkent |
| Mark Smith | msmith |

TABLE A-continued

| Name | User Name |
|---|---|
| Ben Carver | bcarver |
| Violet Sun | vsun |

In table A above, a first column lists the user first and last name. A second column lists the user name corresponding to the user.

Table B below shows an example listing of user groups that may be defined through the administration module.

TABLE B

| Group | Users |
|---|---|
| Marketing | jkent, msmith |
| Engineering | bcarver, vsun |

In table B above, a first column lists the name of the group. A second column lists the users who belong to the corresponding group.

Table C below shows an example listing of applications that may be defined through the administration module.

TABLE C

| Application | Version |
|---|---|
| GDB Debug | 5.1.3 |
| VNC Access and Collaboration | 10.7 |
| Zshell Secure Access | 8.4.2 |

In table C above, a first column lists the name of an application. A second column lists the version of the application.

The administrator can use the administration module to define the virtual network routing tables. In a specific implementation, the virtual network routing tables identify the type of network traffic—based on traffic source, destination, or both—that will use the virtual network. Other traffic, e.g., traffic not identifying the specific IP destinations listed in the virtual routing tables, will be routed to the local or lower level TCP/IP network. The local TCP/IP network may then use a different set of routing tables to forward the traffic to the appropriate destination.

In a step 915, security policies are defined and stored in the policies database. As discussed above, a policy can include rules for who can access what, in what circumstances, and running what applications (e.g., what specific servers that have loaded these applications). A policy may include a programmatic expression to be evaluated, a conditional statement (e.g., if X then do Y else do Z), nested conditionals, multiple conditionals, boolean operators (e.g., OR, AND, or NOT), or combinations of these. For example, an access rule or policy may be structured or formatted as follows:

If <condition> then ALLOW, else DENY

In the above example, use of the virtual network is allowed when the <condition> evaluates to TRUE. Use of the virtual network is not allowed or denied when the <condition> evaluates to FALSE.

Consider, as an example, the following:

If <X> accesses <Y> then ALLOW, else DENY

The X and Y variables can identify users, user groups, application programs, application program versions, application program client components, application program server components, end points, physical machines, physical devices, virtual machines, virtual devices, network domains, or combinations of these that will be allowed to use the virtual network.

A policy can specify, for example, the end points in a particular network domain (e.g., private cloud) that will be allowed to connect to end points in another network domain (e.g., public cloud). Instead or additionally, there can be a policy that specifies the end points a particular network domain that will not be allowed to connect to end points in another network domain.

Below is an example of a policy:
If <user=vsun> accesses <end point=50.63.103,1> then ALLOW, else DENY In this example, the user "vsun" (or "Violet Sun") will be allowed use of the virtual network to connect to the end point associated with IP address "50.63.103.1." Other users may be denied use of the virtual network. Another similar example is: If <end point=172.64.0.1> accesses <end point=50.63.103.1> then ALLOW, else DENY. In this example, it is one end-point server accessing another end-point server in a different network domain.

Below is another example of a policy:

---
If <user group = NOT Engineering> accesses <end point = 50.63.103.1> then DENY, else ALLOW
---

In the above example, users not in the engineering group will be denied use of the virtual network to connect to the end point. Users in the engineering group will be allowed use of the virtual network to connect to the end point. From the example data in table B above, users "jkent" and "msmith" will be denied use of the virtual network because they are in the Marketing group which is not the Engineering group. Users "bcarver" and "vsun" will be allowed use of the virtual network.

As can be appreciated, an administrator can create very granular policies, very broad policies, or both that define the conditions in which use of the virtual network is allowed or not allowed. This allows enterprises to control communication across different network domains in a hybrid cloud environment without having to open their protected legacy networks. An add-on virtual network easily addresses new connection and business requirements.

Security can be specified based on specific computing nodes or machines (e.g., machine A in first domain can connect only to machine B in second domain) or groups of computing nodes or machines (e.g., all machines in machine group A in first domain can connect only to the machines in machine group B in second domain). Security can be specified based on specific application version (e.g., only application version 2.3 in first domain can connect to second domain) such that a security hack by altering application software can be blocked by virtual network access control. Security can be specified based on specific machines executing a specific version of an application (e.g., only application version 2.3 executing on machine A in first domain can connect to machine B in second domain). And so, forth.

As a specific example, consider a scenario where user-A can access a particular application that is running on server-A in the second network domain. When user-A is connected to the server-A and accessing the application, under that situation another user-B is allowed to access server-A at the same time and access a second application. In other words, there can be a policy such that the access right for user-B is only granted while user-A is conducting the access to the same server. Such a policy can be advantageous to security where user-A is an employee to the domain where server-A is deployed. User-B is a vendor who is helping user-A who is working on some application. According to the policy, the vendor, user-B, is never allowed to access the server-A alone. His access is only granted when user-A is connected to server-A. Thus, the "circumstances" for when the virtual network can (or cannot) be used can be a logical condition, a time condition, a geographical condition, a user role condition, a multiple user role condition, a dependency condition, or combinations of these.

Further, because the virtual network is decoupled from the physical network infrastructure, the control can be achieved without having to engage in extensive reconfiguration of the legacy infrastructure.

In a specific implementation, policy evaluation is centralized. In this specific implementation, policy evaluation is at the controller and is not at the individual end points and virtual switches. The policies are not distributed to the end points or switches. This centralized approach helps to reduce the resources needed to execute the end point modules (e.g., control daemon) and virtual switches because the logic for the policy evaluation will be the responsibility of the policy engine at the controller. The centralized approach is more secure as the controller can be strategically protected by enterprise IT and it is not easily reached or altered by users. Furthermore, there will be no storage space requirement at an end point for policies because the policies are stored at the controller. Such a centralized approach can also facilitate scaling and clustering of virtual network infrastructure.

In another specific implementation, policy evaluation is decentralized or a portion of policy evaluation is decentralized. In this specific implementation, there can be policy enforcement end point modules. Policies may be provided to the various end points so that policy evaluation can occur at an end point, virtual switch or both. In such a decentralized approach, it can be easier to scale the intelligence of security policies if there is a requirement for a complex security system.

In a step 920, virtual network agents (e.g., control daemons and virtual network proxies) and virtual routing tables are provided to the end points and virtual network switches. In a specific implementation, the agents, tables, or both are distributed from a central location (e.g., central control server) to the end points. In another specific implementation, the agents, tables, or both are provisioned in conjunction with the provisioning of an end point. For example, there can be a virtual machine template that provides for the installation of an agent, table, or both when a virtual machine is created or cloned from the template.

Figure 10:
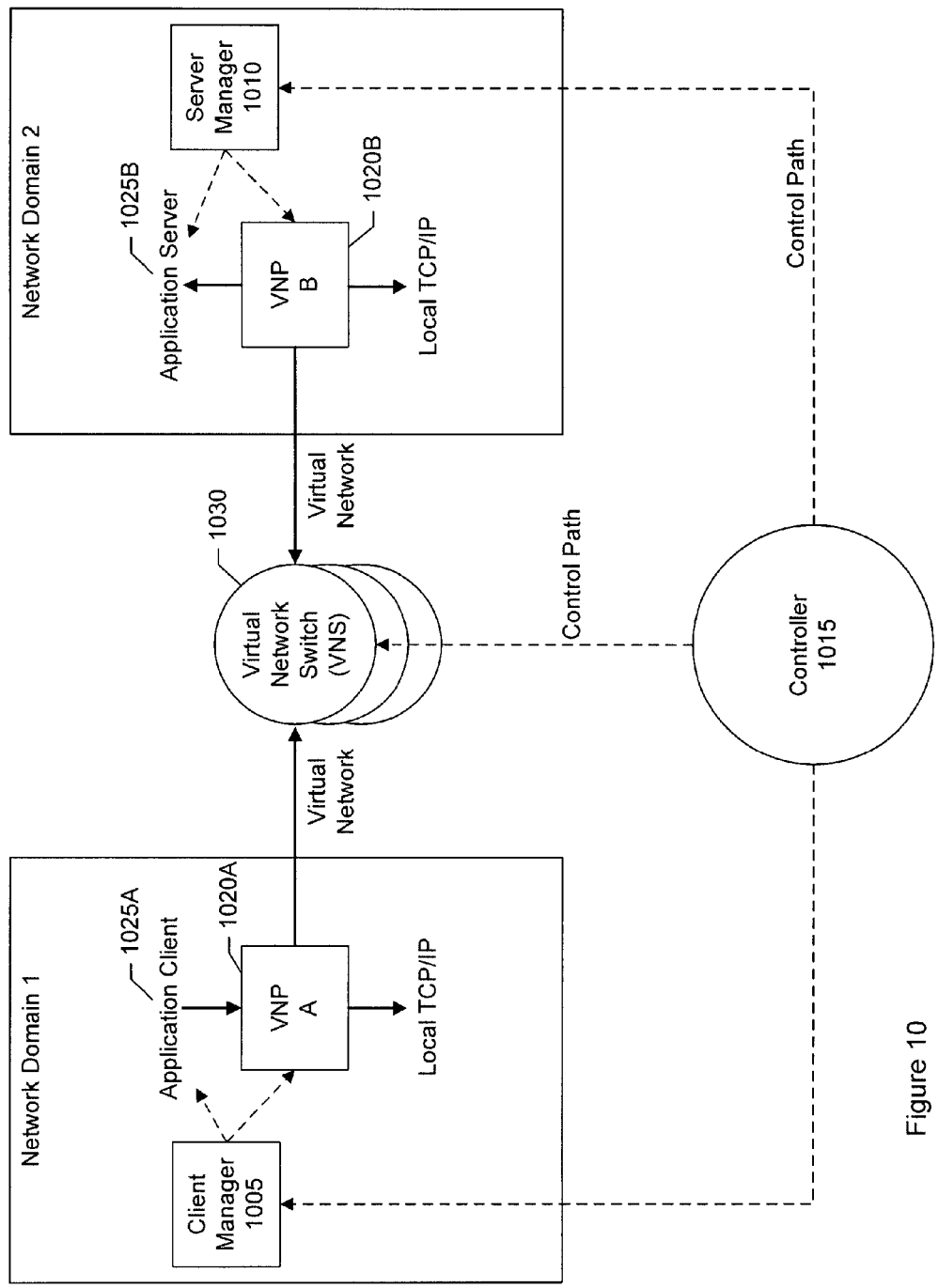
FIG. 10 shows a block diagram of a secure virtual network with L7 control paths.

FIG. 10 shows a block diagram of another specific implementation of a virtual network platform. The system shown in FIG. 10 is similar to the system shown in FIGS. 7-8. In the system of FIG. 10, however, the end points include a manager module to provide enhanced functionality. For example, as shown in FIG. 10, there is a client manager 1005 and a server manager 1010. The client manager is executing at the first end point in the first network domain. The server manager is executing at the second end point in the second network domain.

More particularly, FIG. 10 shows an example of a secure virtual network design with L7 (OSI Layer 7) control paths. The uniqueness of this virtual network design is the enhanced security control on the client-server applications using the virtual network platform. In this specific implementation, there is a client manager and a server manager that manage the client and server applications, as well as to interact with the central controller and control VNPs.

This design facilitates a feature that may be referred to as an "interlock" or "application interlock" or "computing interlock." The "interlock" mechanism helps to ensure that only the authorized client-server applications can use the virtual network for hybrid cloud connections. With the L7 management software at the end point, more intelligence can be built-in to support advanced security functions and application features in a hybrid cloud environment. When it comes to security control, it can be desirable to "integrate" or "interlock" the application level access with the network level access. In a specific implementation, the control is owned by the central controller. Therefore, in this case the virtual network access is then only available to specific applications that are provisioned by the controller at a higher level.

In this specific implementation, security can be implemented at the application layer, operating system layer, or both. The architecture of the platform allows for such security without having to program the network, the computing node on the network, and the application executing in the node.

The "interlock" mechanism facilitates vertical integration for security policy protection. For example, the system can be used to provision servers (or VMs) in two (or more) network domains such that the client-server applications can find each other using the virtual network platform. In this case, the IT administrator configures the central controller and defines an application profile that includes the valid computing flows among the end-points (as the security policy for communication). When a cloud manager adds more VMs into this application profile, the security rules (application profile and the computing flows) are automatically enforced in all end-points. When the end-points need to access each other (e.g., the client-server applications running inside these end-points are trying to reach each other), they will be able to use the pre-defined/allowed virtual networks.

Figure 11A:
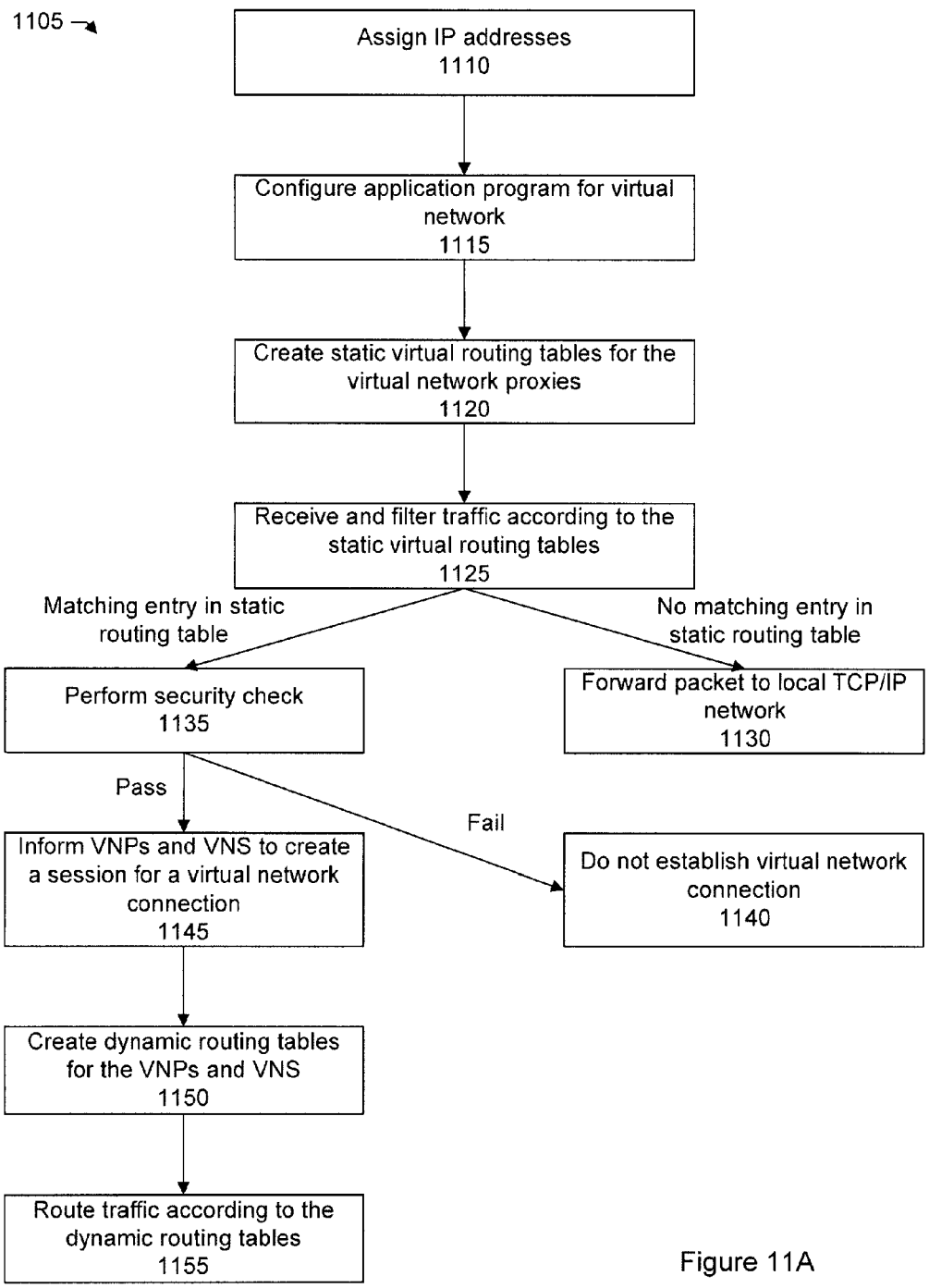
FIG. 11A shows a flow diagram of an operation of the secure virtual network platform.

FIG. 11A shows a flow diagram 1105 of a technique of a virtual network platform as shown in the example of FIG. 10. The virtual routing tables in the virtual network proxies and virtual network switches may be referred to as IP forwarding tables. In a specific implementation, there can be two types of end points when considering the virtual network connections. A first type of end point ("type-1") includes an end point machine where the application client software (or application server software) is a process that is in the same end point machine.

A second type of end point ("type-2") includes an end point gateway where the application client software (or application server software) is a process that is running on the network, not in the end-point gateway. In this specific implementation, in these two types of end points, the network routing considerations are different. The "virtual network routing table" and the way the connections are routed can be different. There can be a case where an end-point in a virtual network is a machine as well as a gateway.

A first type of end point can connect to another end point that is of the first type (e.g., "type-1" connects to "type-1"). A second type of end point can connect to another end point that is of the second type (e.g., "type-2" connects to "type-2"). As can be appreciated, the platform can support many more different connection conditions.

Regarding the first type of end point connections, in a step 1110, IP addresses are assigned. Consider, as an example, a specific implementation of the virtual network platform shown in FIG. 10. For this example, the virtual network will be provisioned to connect an end-point A in a network domain 1 to an end point B in a virtual domain 2. A controller 1015 assigns a first virtual IP address (e.g., "vIPa") to a first virtual network proxy ("VNPA") 1020A, a second virtual IP address (e.g., "vIPb") to a second virtual network proxy ("VNPB") 1020B. The first and second virtual IP address ("vIPa" and "vIPb") are virtual IP addresses which may or may not be routable in the physical TCP/IP network in domain 1 and domain 2.

In a step 1115, an application program is configured to use the virtual network. In this example, the application client software is configured so that it understands that the second virtual IP address ("vIPb") is the IP address to reach the application server software.

In a step 1120, static virtual routing tables are created for the virtual network proxies. These tables help the virtual network proxies (e.g., VNPA or VNPB) to filter traffic and decide whether to forward the packets via the virtual network or to the local TCP/IP network.

Figure 11B:
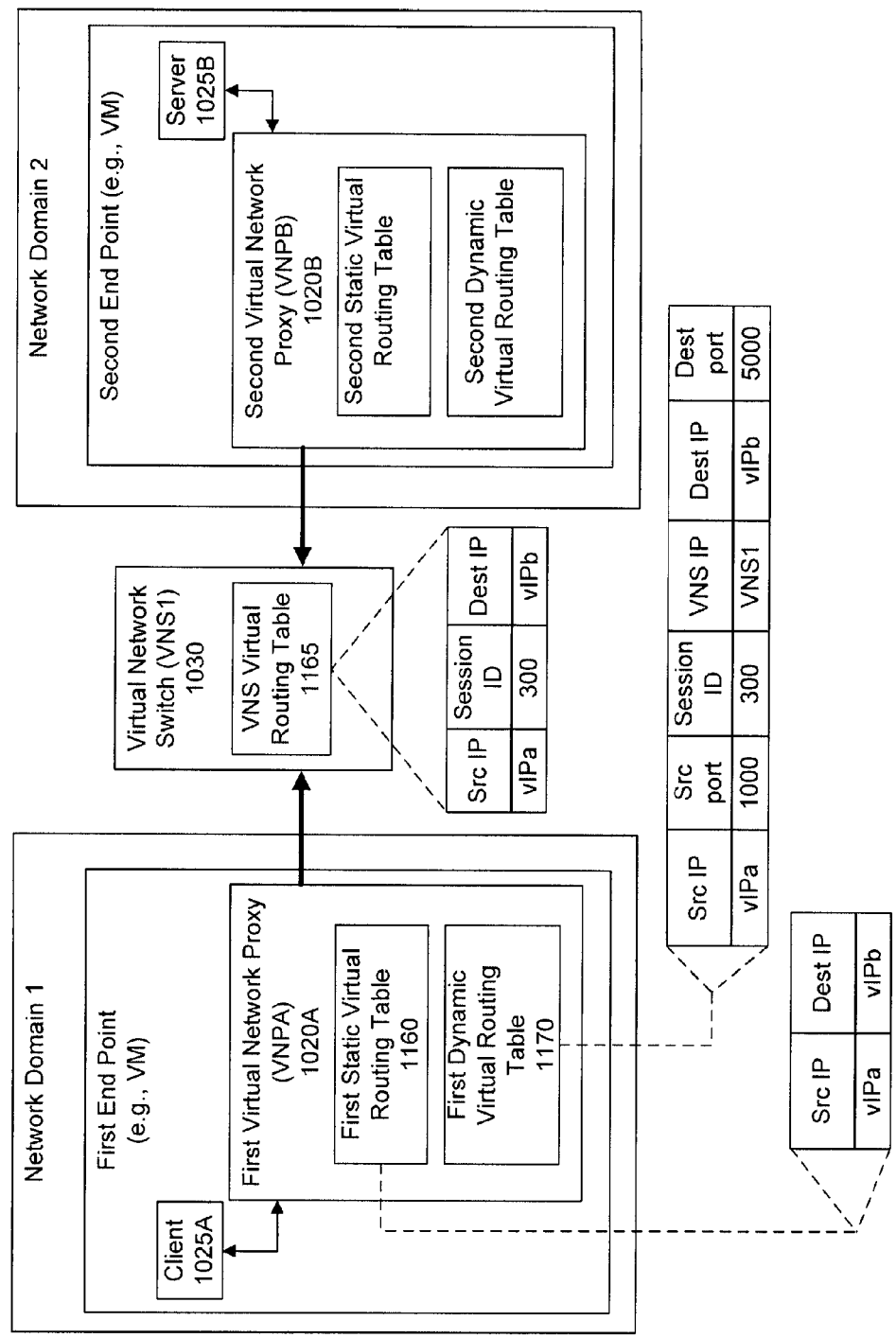
FIG. 11B shows an example of virtual routing tables being generated for a first type of connection across the virtual network.

Referring now to FIG. 11B, table D below shows an example of a static virtual routing table 1160 that may be created for first virtual network proxy (VNPA) 1020A.

TABLE D

| Source IP | Destination IP |
|-----------|----------------|
| vIPa      | vIPb           |

A first column of the table lists the source IP addresses. A second column of the table lists the destination IP addresses that correspond or map to the source IP addresses. In this example, the first virtual IP address ("vIPa") is mapped to the second virtual IP address ("vIPb"). A virtual routing table similar to the routing table shown in table D is created for the second virtual network proxy (VNPB) 1020B. In the type-1 case, both end points can initiate a network connection. That is, a client-server application can be deployed in both directions. In this case, for VNPB initiating a connection to VNPA, its routing table is a swapped version from what is shown in table D. Specifically, in this example, the source IP will be "vIPb" and the destination IP will be "vIPa."

As discussed above, in a specific implementation, the IT administrator uses the controller to create or generate the tables and distribute the tables to the virtual network proxies at the end points. For example, the controller may include a user interface that includes a set of input boxes. Using the input boxes, the administrator can input or enter the addresses and their corresponding address mappings. Alternatively, in another specific implementation, a virtual routing table may be created at an end point.

In a step 1125, traffic or data packets are received and filtered according to the static virtual routing tables. Data packets not having a routing address listed in the static routing table are forwarded to the local TCP/IP network (step 1130). In a specific implementation, determining if the connection should be provided through a virtual network connection includes comparing one or more than one Internet Protocol (IP) addresses associated with the second end point against a list of IP addresses stored at the first end point. In this specific implementation, when the one or more than one IP addresses associated with the second end point are not listed in the list of IP addresses, the connection should not be provided through the virtual network. One or more than one IP address can be associated with an end point. Each IP address can represent one "application server" in the other (e.g., second) network domain that the client wants to address.

Alternatively, if a data packet includes a routing address that matches an entry in the static virtual routing table, a security check 1135 is performed to determine whether a virtual network connection should be established. For example, assuming that an entry in the virtual routing table 1160 at first virtual network proxy (VNPA) 1020A can be found for a data packet, when application client 1025A is making a connection to application server 1025B, client manager 1005 checks with controller 1015 for security permission.

In other words, the manager will seek permission from the controller for the virtual network connection. There can be cases where a routing address is found in the static virtual routing table, but the controller denies the virtual network connection. This can be the result of a policy evaluation by the controller where, for example, one or more parameters of the policy have or have not been satisfied as described in the discussion of policies accompanying FIG. 9, step 915.

The local filtering via the static routing tables (step 1125) at the end points helps to reduce network congestion and bottlenecks. For example, a data packet will not have to be forwarded to a gateway device only to be returned because it is to be routed to the local TCP/IP network rather than the virtual network. The architecture helps to ensure that the system can be easily implemented without having to make expensive investments in upgrading, for example, the switching capacity of the existing network.

If the security check fails (step 1140), the application client is blocked from connecting to the application server. In other words, based on a policy evaluation by the controller, the controller may deny permission to use the virtual network. An alert such as an email, text message, or other notification for the administrator may be generated. The security failure may be recorded in a log.

Alternatively, if the security check passes (step 1145), the controller informs the virtual network proxies and virtual network switches to create a session for the virtual network connection. For example, when the security check is passing, the controller 1015 (FIG. 10) will inform first virtual network proxy (VNPA) 1020A, second virtual network proxy (VNPB) 1020B, and a first virtual network switch (VNS1) 1030, between the first and second virtual network proxies, to create a session for connection. It should be appreciated that there can be multiple (e.g., two or more) virtual network switch units for scalability.

In a step 1150, dynamic virtual network routing tables are created for the virtual network proxies and virtual network switch. Traffic between the first and second network domains is then routed according to the dynamic routing tables (step 1155). Dynamic virtual routing tables can refer to tables that are automatically generated, provisioned, or updated as part of establishing (or terminating) the virtual network connection. For example, the tables may be provisioned after a connection request is received. The tables can be created and updated without user intervention. Static virtual routing tables can refer to tables that are manually provisioned by an administrator as part of a configuration phase for the virtual network. For example, the tables may be provisioned before a connection request is received.

Table E below shows an example of a dynamic routing table 1165 (FIG. 11B) that may be created for first virtual network switch (VNS1) 1030.

TABLE E

| Source IP | Session ID | Destination IP |
|---|---|---|
| vIPa | 300 | vIPb |

A first column of the table lists the source IP address. A second column lists the corresponding session ID. A third column of the table lists the corresponding destination IP address. In a specific implementation, only the Controller is able to provision an entry in the virtual network switch (VNS) table. The restriction on access helps to ensure the security of the virtual network platform.

Table F below shows an example of a dynamic virtual network routing table 1170 (FIG. 11B) that may be created for first virtual network proxy (VNPA) 1020A.

TABLE F

| Source IP | Source Port | Session ID | VNS IP | Destination IP | Destination Port |
|---|---|---|---|---|---|
| vIPa | 1000 | 300 | VNS1 | vIPb | 5000 |

A first column of the table lists the source IP address. A second column lists the corresponding source port. A third column lists the session ID. A fourth column lists identifies the corresponding virtual network switch for the virtual connection. A fifth column lists the corresponding destination IP address. A sixth column lists the corresponding destination port. A similar table is also created in the second virtual network proxy (VNPB) 1020B.

In this example, application client software 1025A sends packets to the second virtual IP address ("vIPb") inside or within the end point machine A in the first network domain. The first virtual network proxy (VNPA) 1020A captures the packets via the static virtual routing table filter function (see table D above).

All packets captured in first virtual network proxy (VNPA) 1020A following the table above are forwarded to virtual network switch (VNS1) 1030 with the session ID, port information, as well as the destination IP information.

All packets received at virtual network switch (VNS1) 1030 are routed based on the dynamic VNS table above (see, e.g., table E). As discussed above, in a specific implementation, provisioning the dynamic VNS table is the responsibility of the controller. The VNS can compare the forwarded information from a VNP with the information provided in the dynamic VNS table to determine where a data packet should be routed. In a specific implementation, the session ID in the forwarded information and the session ID in the dynamic routing table help to identify the proper routing. If the session IDs do not match or correspond, the VNS may not transmit the data packet to the destination IP listed in the routing information forwarded by the VNP. The VNS (via the controller) thus helps to ensure the security of the virtual network.

It should be appreciated, however, that any competent technique may be used to determine whether or not routing information forwarded by a VNP to a VNS corresponds to routing information provisioned in the dynamic VNS table by the controller. Such techniques can include, for example, logic to identify a session, hashing, security tokens, encryption, cryptography, cookies, other variables instead of or in addition to session identifiers, or combinations of these.

All packets that arrive at second virtual network proxy (VNPB) 1020B with the destination IP address of "vIPb"

will be forwarded to the process that owns port 5000 (destination port) on the same end point machine B in the second network domain.

In a specific implementation, a method includes storing at a first end point in a first network domain a static routing table including a list of virtual destination Internet Protocol (IP) addresses, receiving at the first end point a request from a client to connect to a destination, and scanning the static routing table to determine whether an IP address of the destination is listed in the static routing table. The method further includes if the IP address is not listed, passing the request to a TCP/IP network that is local to the first network domain, and if the IP address is listed, seeking permission from a controller to use a virtual network connecting the first network domain to a second network domain, different from the second network domain, the destination being in the second network domain, and upon a determination by the controller that use of the virtual network is permitted, establishing for the client a virtual network connection between the first end point and the destination.

In a specific implementation, the method further includes upon the determination that use of the virtual network is permitted, creating at the first end point a first dynamic routing table having first routing information, the first routing information including a first session identifier that identifies the virtual network connection, and forwarding the first routing information to a virtual network switch between the first and second network domains. The virtual network switch consults a second dynamic virtual routing table having second routing information. The second routing information includes a second session identifier. When the second session identifier corresponds to the first session identifier, the virtual network switch forwards a payload of a data packet from the client to the destination according to the second routing information.

Figure 11C:
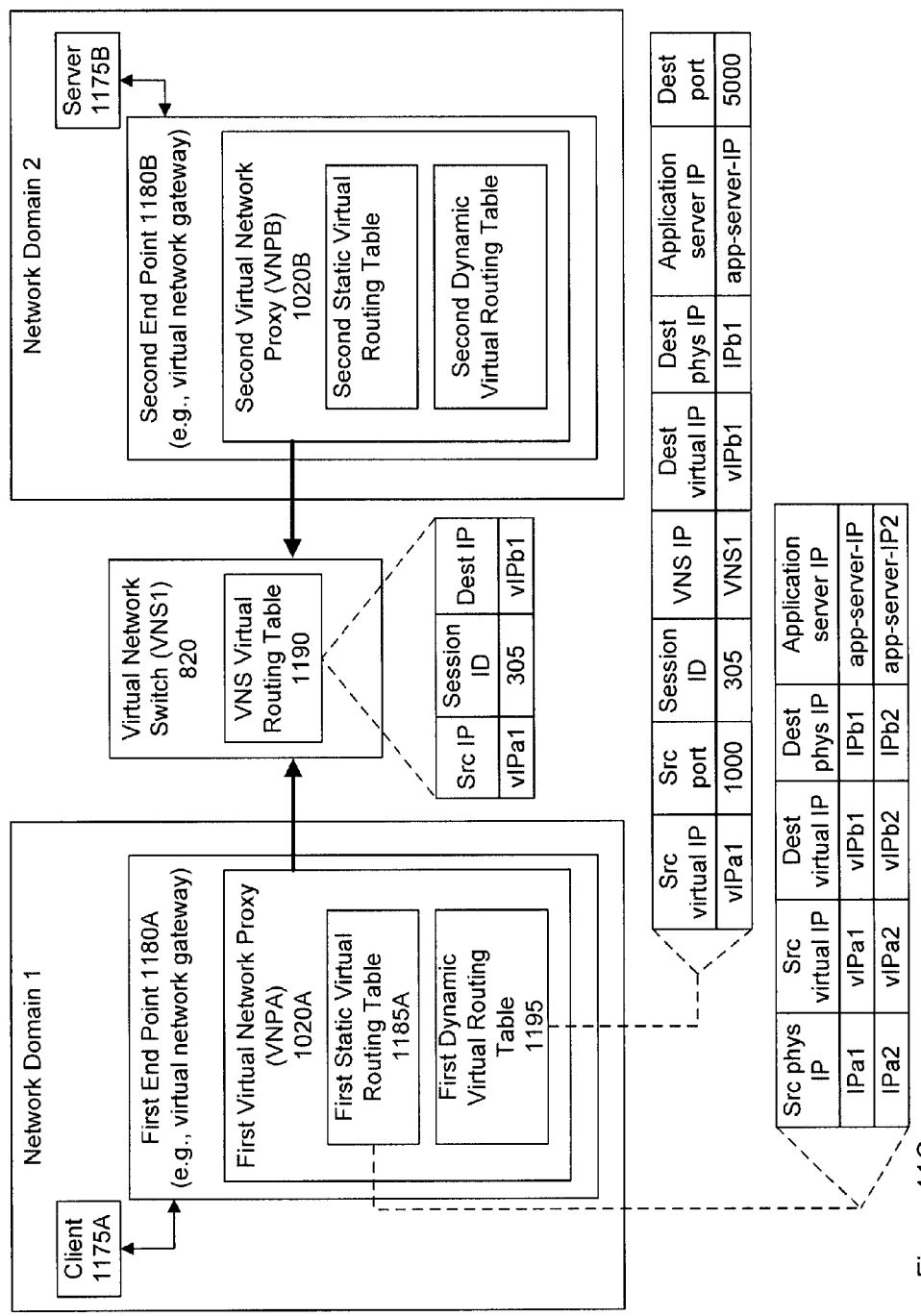
FIG. 11C shows an example of virtual routing tables being created for a second type of connection across the virtual network.

For the second type of end point connections, the application client software and application server software are running outside of or are external to the end-point machines. FIG. 11C shows an example of application client software and application server software 1175A and 1175B, respectively that are not located in end point machines 1180A and 1180B. The end-point machines in this case can be considered as virtual network gateways, not an end point server. In this case, each "client-server" application will be provisioned in the virtual network so that the routing can be accomplished.

Consider again, as an example, the virtual network platform and flow shown in FIG. 10-11A. In step 1110, IP addresses are assigned. When a first client-server application is provisioned on a virtual network that connects end point A as a virtual network gateway in network domain 1 to the end point B as a virtual network gateway in the virtual domain 2, controller 1015 assigns a first IP address ("IPa1") and a first virtual IP address ("vIPa1") to first virtual network proxy ("VNPA") 1020A. The controller assigns a second IP address ("IPb1") and a second virtual IP address ("vIPb1") to second virtual network proxy ("VNPB") 1020B, as well as the application server IP, app-server-IP.

The first virtual IP address ("vIPa1") and the second virtual IP address ("vIPb1") are virtual IP addresses which may or may not be routable in the physical TCP/IP network in first network domain 1 and second network domain 2. The first IP address ("IPa1"), second IP address ("IPb1"), and the address for the application server ("app-server-IP") are physical IP addresses.

In step 1115, the application program is configured for the virtual network. In this example, the application client software, is configured so that it understands the first IP address ("IPa1") is the physical IP address to reach the application server software running in network domain 2.

In step 1120, static virtual routing tables are created for the virtual network proxies. As discussed above, these tables helps the virtual network proxies to filter traffic and forward the packets via virtual network or to the local TCP/IP network (or drop the packets). Table G below shows an example of an entry in a static virtual routing table 1185A (FIG. 11C) that may be created for first virtual network proxy (VNPA) 1020A (which, in this example, is a virtual network gateway).

TABLE G

| Source Physical IP | Source Virtual IP | Destination Virtual IP | Destination Physical IP | Application Server IP |
|---|---|---|---|---|
| IPa1 | vIPa1 | vIPb1 | IPb1 | app-server-IP |

A first column of the table lists a physical IP address of the source gateway. A second column lists the virtual IP address of the source gateway. A third column lists the virtual IP address of the destination gateway. A fourth column lists the physical IP address of the destination gateway. A fifth column lists the IP address of the application server. A similar virtual routing table is created in second virtual network proxy (VNPB) 1020B.

Entries may be added to the virtual routing tables as needed. For example, when a second client-server application is provisioned to route through the virtual network, another entry can be added to the static virtual table as shown in the example of table H below.

TABLE H

| Source Physical IP | Source Virtual IP | Destination Virtual IP | Destination Physical IP | Application Server IP |
|---|---|---|---|---|
| IPa1 | vIPa1 | vIPb1 | IPb1 | app-server-IP |
| IPa2 | vIPa2 | vIPb2 | IPb2 | app-server-IP2 |

In step 1125, as discussed above, traffic or data packets are received and filtered according to the static virtual routing tables. Data packets not having a routing address listed in the static routing table are forwarded to the local TCP/IP network (step 1130). Alternatively, data packets having an address listed in the static routing table trigger a security check. In a specific implementation, when the application client is making a connection to the application server, the IP network in first network domain 1 routes the packets to the first virtual network proxy (VNPA). Client manager 1005 then checks with controller 1015 for security permission, on demand (step 1135).

When security check passes, controller 1015 will inform the first virtual network proxy (VNPA), second virtual network proxy (VNPB), and the virtual network switch (VNS1) to create a session for connection (step 1145). There can be multiple VNS units for scalability.

In step 1150, dynamic routing tables are created. Table I below shows another example of a dynamic routing table 1190 (FIG. 11C) that may be created for the virtual network switch.

TABLE I

| Source IP | Session ID | Destination IP |
|---|---|---|
| vIPa1 | 305 | vIPb1 |

As discussed above, in a specific implementation, only the controller is able to provision an entry in the VNS table to ensure the security of the system. In other specific implementations, where, for example, security is not too high of a concern, the VNS table may be provisioned by a module other than the controller. Such provisioning can help to increase response time and network performance.

Table J below shows an example of a dynamic virtual network routing table 1195 (FIG. 11C) created for the first virtual network proxy (VNPA).

TABLE J

| Source Virtual IP | Source Port | Session ID | VNS IP | Destination Virtual IP | Destination Physical IP | Application Server IP | Destination Port |
|---|---|---|---|---|---|---|---|
| vIPa1 | 1000 | 305 | VNS1 | vIPb1 | IPb1 | app-server-IP | 5000 |

A first column of the table lists the virtual IP address of the source gateway. A second column lists the port of the source gateway. A third column lists the session ID. A fourth column lists the IP address of the virtual switch. A fifth column lists the virtual IP address of the destination gateway. A sixth column lists the physical IP address of the destination gateway. A seventh column lists the IP address of the application server. An eighth column lists the destination port. A similar table is also created in the second virtual network proxy (VNPB) 1020B.

In this example, all packets captured in the first virtual network proxy (VNPA) following the table above are forwarded to the virtual network switch (VNS1) with the session ID, the port information as well as the destination IP information. All packets received at the virtual network switch (VNS1) will be routed based on the dynamic VNS table above. All packets arriving at the second virtual network proxy (VNPB) with the destination virtual IP address of "vIPb1" will be forwarded to app-server-IP with port 5000. In this forwarding traffic, the source IP will be "IPb1," i.e., the physical IP address of the destination gateway from the table above.

Figure 12:
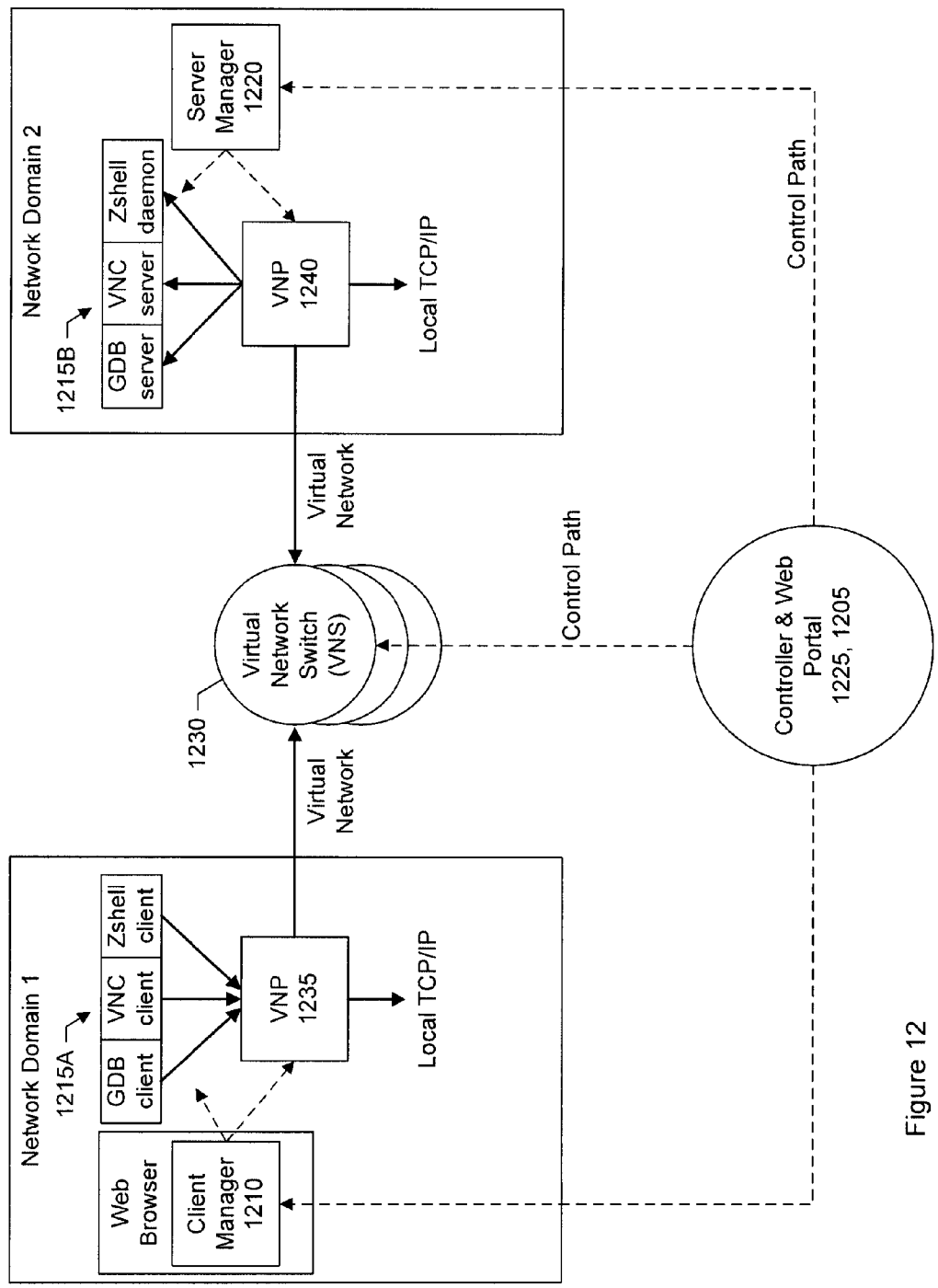
FIG. 12 shows a block diagram of a secure virtual network for secure remote access, debug, and collaboration applications.

FIG. 12 shows a block diagram of another specific implementation of a virtual network platform. The system shown in FIG. 12 is similar to the system shown in FIG. 10. In the system of FIG. 12, however, the platform is further enhanced with a central web portal 1205, a web browser with client manager 1210, and various client-server applications 1215A, B that are managed by the client manager and a server manager 1220. The virtual network interlock capability is built in and enforced by the client manager and server manager to lock the application software and the usage of virtual network.

The platform supports secure remote access, operation, debug, and collaboration without re-engineering or re-provisioning enterprise existing network and security infrastructure. During the access, the enterprise IP (Intellectual Property) and secure data stay behind their layers of firewalls. A specific version of the application software can be locked and used on the remote access platform for security compliance. In a specific implementation, only the packets generated by the authorized access, debug, and collaboration tools are allowed to travel through the virtual network.

The example of the secure remote access platform shown in FIG. 12 includes virtual network controller 1225, a virtual network switch (VNS) 1230, virtual network proxy (VNP) 1235 and 1240 on both client and server sides, respectively, central web portal system 1205, client manager 1210 managing application client software 1215A, and server manager 1220 managing application server software 1215B.

All client-server applications on this platform (e.g. access, collaboration, GDB debug, and Zshell) are controlled end-to-end horizontally between network domains and top-down from application layer to the secure network layer vertically. The client-server application connections are realized via the virtual network infrastructure underneath.

Table K below shows a flow of a specific implementation of the system.

TABLE K

| Step | Description |
|---|---|
| 1 | A user can log on to the web portal via a web browser. Given a privilege control, the user can choose to use an access and collaboration tool (e.g., VNC), a remote debug tool (e.g., GDB), and a secure shell access tool (e.g., Zshell) from links offered on a web page. By clicking the link, the system platform will execute one or more of the following steps 2-8: |
| 2 | A package including the client manager software, application client software, and VNP is dynamically downloaded via web browser plug-in. |
| 3 | Client manager requests security permission from the controller for the operation associated with the link. |
| 4 | Controller allows it (or denies it based on policy) and informs server manager to prepare application server and turn on virtual network with connection controlled by VNP, connecting to VNS. Prior to the connection request, deploy the access server with the server manager and application server software. |
| 5 | Controller informs VNS to allow two connections from VNPs on both the client and server ends. The two connections will be formed in a pair and the data are securely switched in VNS. |
| 6 | Controller informs client manager that the permission granted. |
| 7 | Client manager starts application client software, connecting to VNP, and then connects to VNS via virtual network. |
| 8 | The end-to-end client-server applications are then connected and interlocked with the virtual network. |

In a specific implementation, the virtual network platform is used in conjunction with a debugging application referred to as GNU Project debugger (GDB). In this specific implementation, with this secure remote access platform, a client-server GNU GDB tool can connect between two network domains to perform source code debug without changing any of the underneath network infrastructure. With this capability, the data files stay behind the firewall in a network domain (e.g., second network domain). The source code of the application software under debug stay in another network domain (e.g., first network domain). The data files and source codes are considered sensitive corporate IP and can be prevented from being transferred out of the enterprises.

It can be desirable to ensure that a specific version of the GDB client and software tools are used on this platform. The original GNU GDB tools include some special functions that are considered security violations for many enterprises when used in a cross domain environment. In this specific implementation, a special version of the GDB software with the malicious (or undesired) functions removed can be "locked" in this platform for usage.

In another specific implementation, the virtual network platform is used in conjunction with a desktop sharing application referred to as VNC Access and Collaboration. VNC is very popular and has been widely used in the high tech industry for remote virtual desktop access and collaboration. Over this specific implementation of the secure remote access platform, a special version of VNC can be embedded to support remote access and collaboration function.

More particularly, VNC carries some native features that may be undesirable to the enterprises in terms of security when used in a cross domain environment. A special version of VNC with these features removed can be embedded and "locked" in this platform for usage.

VNC supports a collaboration mode with a view sharing for the virtual desktop. On this specific implementation of the secure remote access platform with web portal a browser control, one can implement a desirable collaboration feature where a "guest" can be invited to join a live VNC session owned by another user. The guest can only join this VNC session when it is live. The owner of the VNC session does not need to release his or her secure password to the guest for signing on. The platform hides the complexity and makes the collaboration session very simple and yet secure.

Another example of a desirable function that can be offered on this specific implementation of the platform is an "administrator enforced join" into any live VNC session. With a proper privilege control on the web portal system, one user can have a high privilege to actively join into a VNC session that is owned by another user.

In another specific implementation, the virtual network platform is used in conjunction with a shell application referred to as Zshell. Zshell is a secure shell feature that allows one party to execute a specific and pre-defined set of shell commands in another domain without opening the network. When two companies are collaborating across domains, frequently a specific set of tasks need to be executed by guests in a secure environment.

However, given the constraints in the modern enterprise environment, the network and computing environment have to be "open" even just to support running a small set of tasks. However, once the network and computing environment are open to support these tasks, it becomes extremely difficult to ensure that only the set of tasks was executed in the environment. The corporate compliance could be compromised in such a scenario.

Zshell is a function designed to avoid the overhead and yet achieve the goal of executing the limited set of tasks via a shell. In this specific implementation, when Zshell is integrated in the secure remote access platform, the Zshell feature along with the "interlock" capability of the platform enables the "guest" to execute only a given set of commands in the remote domain. No other network connection is open. No other computing capability is granted in such a case. The same benefits from avoiding "opening" the network via the "interlock" capability with the virtual network applies to other applications such as and not limited to GDB and VNC.

In this specific implementation, a pre-defined set of shell commands is associated with each server manager. The association can be enforced by the central web portal. The user access of Zshell is then offered through the front-end web browser and client manager. Once the Zshell client tool is connected to the Zshell daemon, the corresponding set of shell commands will be associated by the Zshell daemon to limit the tasks that can be executed by the user. Note that the server manager can be deployed in an access server, where the access server can be easily deployed anywhere inside a company network domain. The programmability of a specific set of commands (i.e., task execution) can be dynamically inserted anywhere inside a corporation for business needs and made available to external guests without compromising security.

In various specific implementations, a novel platform is provided for secure remote access, operation, debug, and collaboration. GDB Debug, VNC Access and Collaboration, and Zshell Secure Access are some examples of client-server applications that can be locked on this platform to support secure functions and features for enterprise remote operations. It should be appreciated, however, that the merits of this platform and technology are not limited to the presented functions and features. The design principles and aspects discussed in this patent application can be applied to many other client-server applications that can be integrated and locked on this platform and achieve business benefits.

To support a fairly complex operations scenario, multiple features on this secure remote access platform can be applied and used in a mixed format. Multiple access servers with different features selected and enabled can be offered in parallel and to users with different role and privilege.

Figure 13:
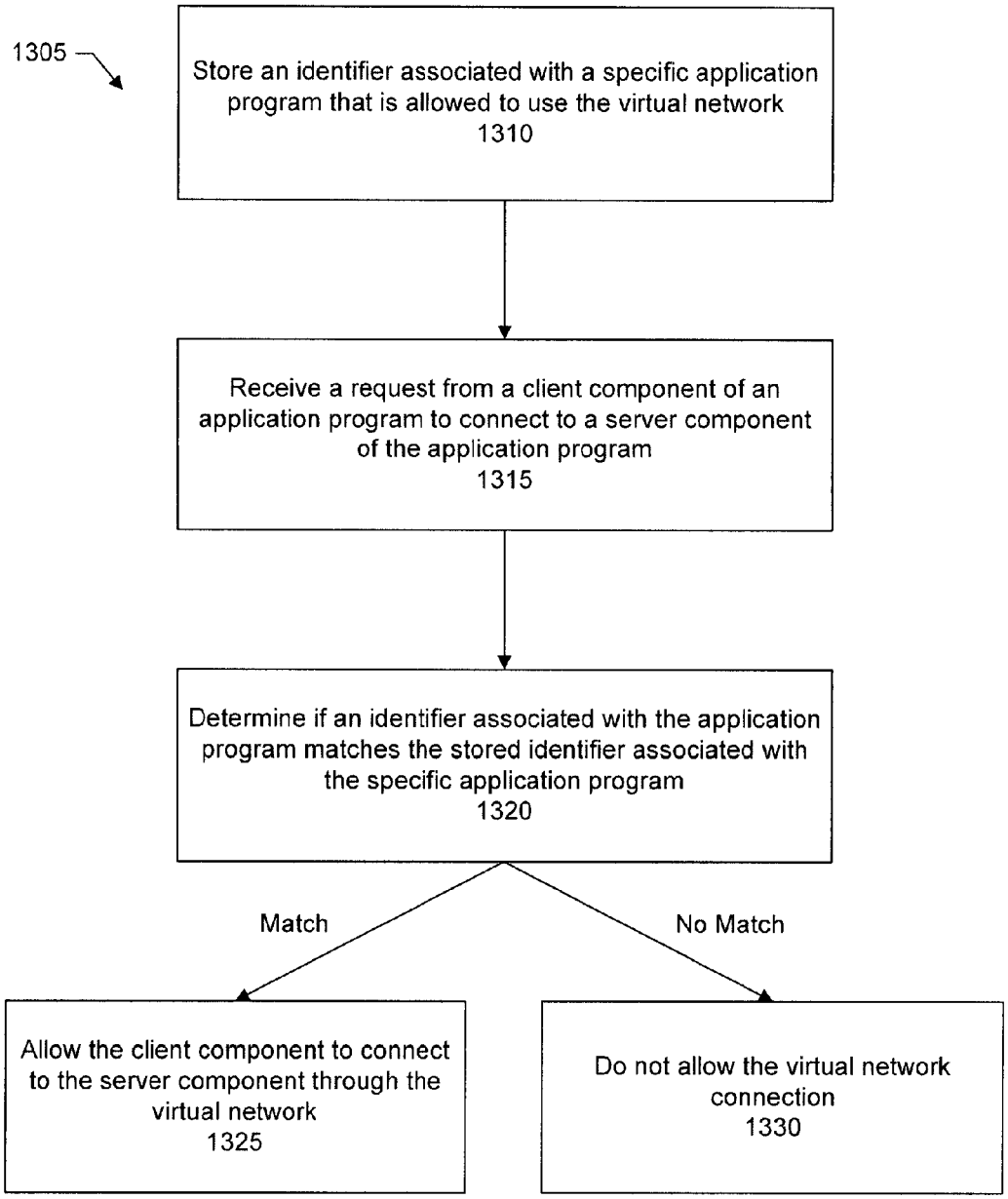
FIG. 13 shows a flow diagram of an "interlock" mechanism of the secure virtual network platform.

FIG. 13 shows an overall flow 1305 of a specific implementation of the "interlock" mechanism. In a step 1310, the system stores an identifier or predetermined identifier associated with a specific application program (or a specific version of the application program) that is authorized or allowed to use the virtual network. The identifier may be calculated by the system. Alternatively, the identifier may be calculated using an algorithm that is external to the system. The identifier can be any unit of data that helps to uniquely identify a particular version of the application program. In a specific implementation, the identifier includes a checksum associated with a particular version of the application program. An identifier for an application can include a signature, hash value, fingerprint, or combinations of these. In a specific implementation, the identifier may be provided to and stored at one or more end points in a network domain.

In a step 1315, a request is received from a client component of an application program to connect to a server component of the application program. For example, the request may be received at an end point module (e.g., client manager) at the end point.

In a step 1320, a determination is made by the respective client or server manager (see, e.g., FIG. 12) as to whether an identifier associated with the application program matches the stored identifier associated with the specific application program. If there is a match, in a step 1325, the client component may be allowed to connect to the server component through the virtual network. In a specific implementation, use of the virtual network is subject to further approval by the controller. In another specific implementation, use of the virtual network is allowed without further approval from the controller. This specific implementation can be desirable in cases where security is less of a concern than, for example, response time and network performance.

Alternatively, if there is not a match, in a step 1330, the client component is not allowed to connect to the server component through the virtual network. In other words, in a specific implementation, an identifier is associated with each application program authorized to use the virtual network. In a specific implementation, when the client application at the first end point in the first network domain attempts to connect to the server application at the second end point in the second network domain via the virtual network, a check is performed to determine if the application is authorized to use the virtual network. The check includes comparing an identifier associated with the application against the list of identifiers associated with the authorized applications (step 1320). If there is a match, a virtual network connection may be allowed between the two end points (step 1325). If there is not a match, the virtual network connection is not allowed (step 1330).

Consider, as an example, table L below. Table L lists the identifiers for application program versions shown in table C.

TABLE L

| Application | Version | Identifier |
|---|---|---|
| GDB Debug | 5.1.3 | ID1 |
| VNC Access and Collaboration | 10.7 | ID2 |
| Zshell Secure Access | 8.4.2 | ID3 |

The example data shown in table L shows the specific versions of the application programs that are authorized or allowed to use the virtual network. From the data above, the application "VNC Access and Collaboration" version 10.7 having the identifier ID2 is allowed use of the virtual network. A different version of the application (e.g., version 9.0) will have a different identifier, e.g., ID7. In this example, version 9.0 of the application will not be allowed to use the virtual network because the identifiers (ID2 and ID7) do not match.

As discussed above, the "interlock" mechanism helps to ensure that only specific applications (or specific versions of applications) will be able to use the virtual network. For example, an application program (e.g., GDB Debug, VNC Access and Collaboration, or Zshell Secure Access) may include functions, services, options, modules, or capabilities that an IT administrator wishes to disable or modify. The disablement or modification can be for any number of reasons. One reason can include security. For example, a function of an application program may be disabled to help prevent employees of the enterprise from using the function to steal sensitive corporate information. Another reason can include application performance. For example, a service of an application program may be disabled to reduce the application size or space requirements, to improve application response time, and so forth.

In another specific implementation, the system stores a list of identifiers associated with banned application programs or application programs that are not allowed to user the virtual network. In this specific implementation, a check includes comparing an identifier associated with the application against a list of identifiers associated with banned or unauthorized applications. If there is a match, a virtual network connection is not allowed between the two end points. If there is not a match, a virtual network connection is allowed between the two end points.

FIGS. 14-15 show flow diagrams for updating the virtual routing tables based on end point changes in a network domain. More particularly, FIG. 14 shows a flow 1405 when an end point is added in a network domain. In a step 1410, the system discovers an addition of a new end point in a network domain.

In a specific implementation, the discovery is facilitated through a cloud manager component of the controller. In this specific implementation, the cloud manager component provides a tool or an automated mechanism that the administrator uses to provision the network with a new end point such as a new virtual machine. The provisioning operation can include providing the new end point with the end point modules and appropriate application software such as, for example, the control daemon, virtual network proxy, client or server manager, and so forth. The end point module in the newly added end point may execute a set of instructions to notify the controller of its existence.

In another specific implementation, the end point may be created within a network domain that may belong to another authoritative entity. For example, the network domain may belong to a third-party cloud services provider. In this specific implementation, the controller includes a programmatic interface that communicates with an application programming interface (API) of the cloud service provider to discover the new end point and information about the new end point. The information can include, for example, an inventory of application programs that have been provided at the new end point, application version information, configuration information, and so forth.

The cloud manager tool can compare the inventory and configuration information of the newly provisioned end point with an approved inventory listing of applications and configurations. This check helps to ensure that the new end point has been provisioned with the appropriate application programs, application program versions, configuration settings, and so forth. If the new end point has not been properly provisioned, the system may prevent the addition of the end point to the virtual network platform. Instead or additionally, the cloud manager tool may provide the new end point with the appropriate application software, configuration settings, end point modules, or combinations of these so that the end point module can be incorporated into the virtual network platform.

In a step 1415, the controller, upon discovering the new end point, automatically updates the virtual routing tables to include the new end point, inside the new end point as well as in other existing end points that relate to this new end point. For example, the controller may make an entry in a virtual routing table of an existing end point to include an IP address and a virtual IP address to connect to the new end point. The IP address can identify the new end point in the domain. The virtual IP address can identify the source device for packets originating from the new end point.

As an example, in the case of the first type of end point connection when adding a new end-point server, the system will add entries in the static virtual routing table that represents all other end-point servers in other network domains that this new server can connect to via the virtual network.

In a step 1420, the updated virtual routing tables are distributed throughout the virtual network platform. The previous virtual routing tables may then be replaced with the updated virtual routing tables.

FIG. 15 shows a flow 1505 when an end point is deleted from a network domain. In a step 1510, the system discovers the deletion of an end point in a network domain. The method of discovery may be similar to the method described in step 1410 (FIG. 14). For example, in a specific implementation, deletion of the end point may be through the cloud manager component of the controller. In this specific implementation, the cloud manager may include a user interface that allows the administrator to identify and delete a particular end point.

In a case where the end point is created in a network domain of a third-party cloud services provider, the cloud manager provisioned by the provider may notify the controller of the deletion. The notification may be a message, email, or other alert. The deletion may be under the direction of the controller or is executed by the external cloud manager. For example, the controller may programmatically (e.g., through an API) instruct the cloud services provider to delete, remove, deactivate, or disable an end point if it is under the direction of the controller.

In a step 1515, the controller, upon discovering that an end point has been deleted from the network domain, automatically updates the virtual routing tables to remove the deleted end point. For example, the controller may remove entries in the virtual routing tables that reference or are associated with the deleted end point.

As an example, in the case of the first type of end point connection, when deleting an end point, the system deletes this end point server and deletes the corresponding entry in all other end point servers. When the application client software is using the virtual network for a connection, the system will then generate an entry in the dynamic virtual routing table where each entry includes more information or updated information as appropriate based on the end point changes.

In a step 1520, the updated virtual routing tables are distributed throughout the virtual network platform. The distribution may be similar to the process described in step 1420 (FIG. 14).

The flow for adding and deleting end points or end point servers accommodates the "application interlock" checking mechanism. As discussed above, in a specific implementation, the system includes a "client manager" that can also control the validated application client and server software. In this specific implementation, when the application client software is triggering the "dynamic virtual routing table", the system will ask or request the client manager to check in the operating system (OS) if the application client software that is creating the network traffic is the one validated by the system. Only the validated applications are allowed when using VNP and the virtual network.

Referring now to FIGS. 5, 7-8, 10, and 12, the architecture of the virtual network platform shown in these figures offers a number of benefits and advantages. In a specific implementation, a controller cluster can be implemented to support control path connections to a very large amount of end points. There can be a master controller that implements and maintains security policy (write and read) in the central database. Cluster controllers may implement read only function for security policy and connect to end points for policy enforcement. In a specific implementation, one controller can connect to multiple virtual network switches in parallel. However, each VNS may connect to only one controller.

A virtual network switch cluster can be implemented to support virtual network connections to a very large amount of end points. In a specific implementation, a VNS is considered as a "slave device" fully controlled by the controller. In this specific implementation, the VNS does not include security intelligence. All security policies are implemented and controlled by the controller. In a specific implementation, there is no inter-dependency among VNS clusters. The lack of interdependency eases scalability. Load balancing can also be easily implemented.

In a specific implementation, a virtual network proxy includes a virtual network gate keeper on an end point that implements the virtual routing table and TCP proxy and reverse proxy functions. In a specific implementation, there is no intelligence for security policy. The VNP is responsible for encryption and decryption of the virtual network transport. The VNP works with and is controlled by the control daemon and client/server manager.

In a modern enterprise environment, the network and infrastructure security have complex requirements. It can be challenging to deploy a client-server application across such an environment without modifying the underneath infrastructure and setting. The secure virtual network platform as discussed in this patent application solves this problem without compromising enterprise security and compliance requirements.

In a specific implementation, the client-server application is provisioned at the virtual network layer and does not require opening the physical firewalls or changing the subnets or network topology underneath. The specific client-server application is provisioned in this virtual layer so that only a particular application is allowed to connect in this layer for security control. The security policy and provisioning setting is at a central control. All connections are automatically verified and executed end-to-end in a closed system. The burden of managing distributed components and assembling them together in a coherent framework is reduced.

The applications of such secure virtual network platform can be enormous. Any new business applications that need to be provisioned across a legacy environment can go to the virtual layer for ease of control, best or good productivity, fast time to market, and ease of security and compliance control. In today's market, many industry verticals are converging and becoming service oriented. There are more and more business collaborations and IT automations across enterprise boundaries. Such a secure virtual network can significantly expedite the business process provisioning and save costs.

As discussed above, the hybrid cloud computing is another important application that can be benefited by this new technology. By definition the hybrid cloud infrastructure spans over multiple network domains with more than one authority. The computing resources in such an environment are dynamically created and deleted on demand. Efficiency in doing so is vital to the success of enterprise operations in a hybrid cloud. A virtual network layer is critical to provision various enterprise applications in such a hybrid cloud environment. It is extremely easy for enterprise IT to provision applications in the proposed virtual network platform. Once the application is provisioned, the virtual network connection and deletion are fully automated along with the dynamic provisioning of end points in the cloud.

Figure 16:
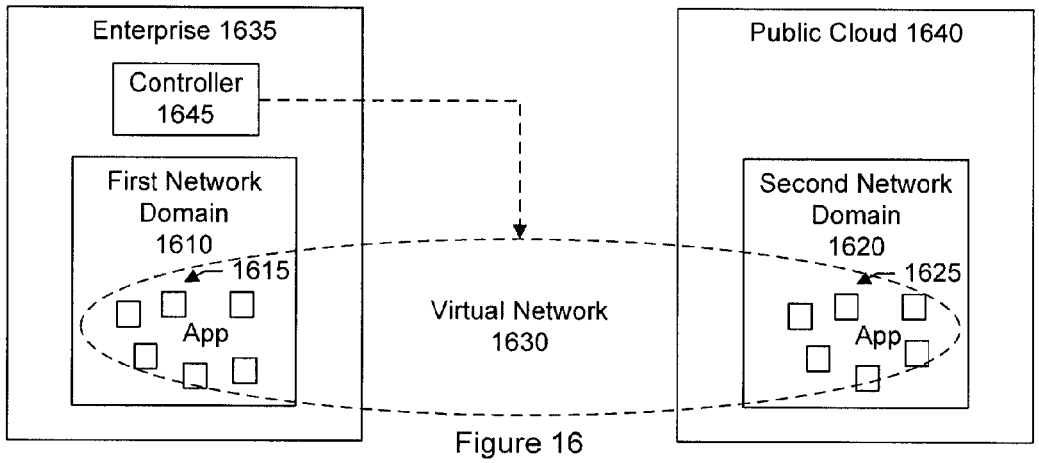
FIG. 16 shows an example of a deployment model for a secure virtual network platform.
Figure 17:
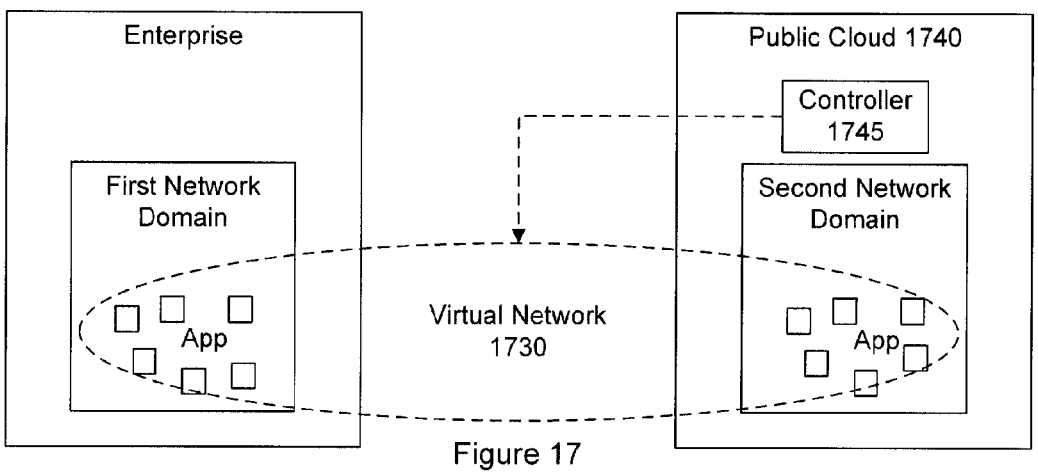
FIG. 17 shows another example of a deployment model for a secure virtual network platform.
Figure 18:
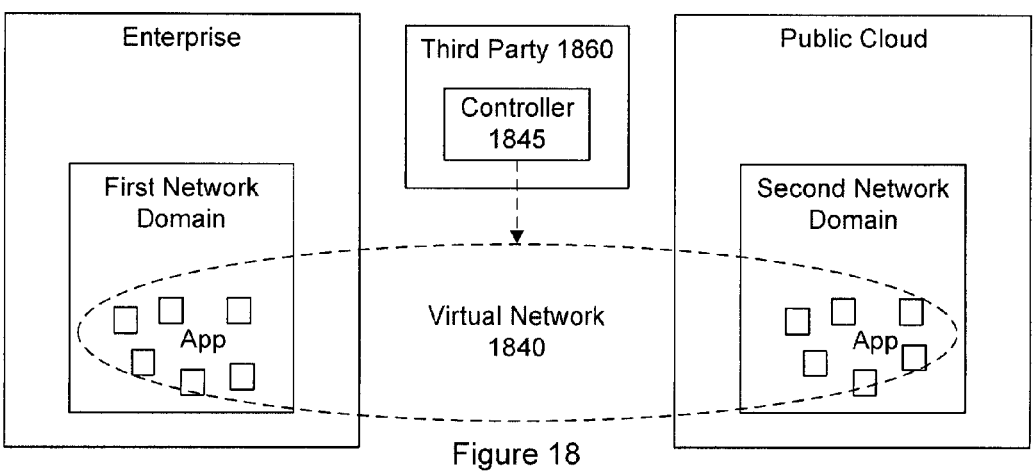
FIG. 18 shows another example of a deployment model for a secure virtual network platform.

FIGS. 16-18 show block diagrams of specific implementations of deployment models for the virtual network platform. FIG. 16 shows a first network domain 1610 including a first set of end points 1615, a second network domain 1620 including a second set of end points 1625, and a virtual network 1630 connecting the first and second end points.

The first network domain is part of an enterprise 1635. The second network domain is part of a public cloud provider 1640. In this specific implementation, control 1645 of the virtual network is with the enterprise.

FIG. 17 shows another specific implementation of a deployment model for the virtual network platform. FIG. 17 is similar to FIG. 16. In FIG. 17, however, control 1745 of a virtual network 1730 is with a public cloud provider 1740.

FIG. 18 shows another specific implementation of a deployment model for the virtual network platform. FIG. 18 is similar to FIG. 16. In FIG. 18, however, control 1845 of a virtual network 1840 is with a third party 1860 that provides the services associated with the virtual network.

Referring now to FIG. 11A (step 1125), as discussed above, in a specific implementation, the static routing tables define the traffic that may be allowed to use the virtual network. It should be appreciated, however, that aspects and principles of the invention can be applied to implement static routing tables that define traffic not allowed to use the virtual network. For example, in a specific implementation, there can be a static routing table that identifies, by IP address, data that is to be passed to the local TCP/IP network. In this specific implementation, data not having an IP address defined in the static routing table is transmitted through the virtual network.

In the description above, aspects of the system have been described in the context of a client in one network domain communicating with a server in another network domain. It should be appreciated, however, that aspects of the system can also be applied to the server communicating with the client. Aspects of the system can be applied to a computing node in one network domain communicating with a computing node in another network domain, and vice-versa.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
   providing a cluster of virtual network switches, the cluster of virtual network switches being coupled between a first network domain and a second network domain, wherein the cluster of virtual network switches is separate from the first and second network domains, and the second network domain is separate from the first network domain;
   providing a cluster of controllers coupled to the cluster of virtual network switches, the first network domain, and the second network domain;
   receiving at a first end point in the first network domain a request to make a connection to a second end point in the second network domain;
   determining if the connection should be provided through a virtual network connecting the first network domain with the second network domain; and
   if the connection should be provided through the virtual network, establishing a virtual network connection between the first end point and the second end point to transmit a payload from the first network domain to the second network domain, wherein the establishing comprises:
      initiating by the first end point, as allowed by a controller of the cluster of controllers, first traffic from the first network domain to a virtual network switch of the cluster of virtual network switches, the first traffic being allowed through a first firewall of the first network domain because the first traffic is outbound from the first network domain to the virtual network switch, the first traffic thereby being first outbound traffic;
      initiating by the second end point, as allowed by the controller, second traffic from the second network domain to the virtual network switch, the second traffic being allowed through a second firewall of the second network domain because the second traffic is outbound from the second network domain to the virtual network switch, the second traffic thereby being second outbound traffic; and
      placing by the virtual network switch the payload from the first outbound traffic established by the first end point into a reply to the second outbound traffic established by the second end point residing in the second network domain.

2. The method of claim 1 wherein the first end point, second end point, or both comprises an isolated virtual environment.

3. The method of claim 1 wherein the determining if the connection should be provided through the virtual network comprises:
   determining whether a destination address for the payload is listed in a static virtual routing table stored at the first end point, the static virtual routing table comprising a list of addresses for the second network domain; and
   if the destination address is listed in the static virtual routing table, seeking approval of the controller for the virtual network connection.

4. The method of claim 3 comprising:
   if the destination address is not listed in the static virtual routing table, forwarding the request to a local TCP/IP network inside the first network domain.

5. The method of claim 1 comprising:
   storing at the first end point a static virtual routing table comprising a list of destination addresses for the second network domain that the first end point is allowed to connect to through the virtual network.

6. The method of claim 5 comprising:
   upon discovery of a new end point, updating the static virtual routing table to include the new end point; and
   distributing the updated static virtual routing table to the first end point.

7. The method of claim 5 comprising:
   upon discovery of a deletion of an end point, updating the static virtual routing table to remove the deleted end point; and
   distributing the updated static virtual routing table to the first end point.

8. The method of claim 1 wherein the determining if the connection should be provided through the virtual network comprises:
   computing an identifier associated with an application program that is running in the first end point;

comparing the identifier to a white list of authorized identifiers; and
if the identifier is in the white list, determining that the connection is allowed to be provided through the virtual network.

9. The method of claim 1 wherein the determining if the connection should be provided through the virtual network comprises:
computing an identifier associated with an application program that is running in the first end point;
comparing the identifier to a black list of identifiers; and
if the identifier is not in the black list, determining that the connection is allowed to be provided through the virtual network.

10. The method of claim 1 comprising:
if the connection should not be provided through the virtual network, dropping the request.

11. The method of claim 1 wherein one of the first or second network domains comprises a private network domain, and another of the first or second network domains comprises a public network domain.

12. A method comprising:
providing a cluster of virtual network switches, the cluster of virtual network switches being coupled between a first network domain and a second network domain, wherein the cluster of virtual network switches is separate from the first and second network domains, and the second network domain is separate from the first network domain;
providing a cluster of controllers coupled to the cluster of virtual network switches, the first network domain, and the second network domain;
storing a list identifying one or more specific application programs that are not allowed to use a virtual network connecting the first network domain with the second network domain;
receiving at a first end point in the first network domain a request from a client component of an application program to make a connection to a server component of the application program, the server component of the application program being at a second end point in the second network domain;
determining from the list if the application program is one of the one or more specific application programs that are not allowed to use the virtual network;
if allowed, establishing for the application program a virtual network connection between the first end point and the second end point to transmit a payload from the first network domain to the second network domain, wherein the establishing comprises:
initiating by the first end point, as allowed by a controller of the cluster of controllers, first traffic from the first network domain to a virtual network switch of the cluster of virtual network switches, the first traffic thereby being first outbound traffic from the first network domain;
initiating by the second end point, as allowed by the controller, second traffic from the second network domain to the virtual network switch, the second traffic thereby being second outbound traffic from the second network domain; and
placing the payload of the first outbound traffic coming from the first network domain into a reply to the second outbound traffic from the second network domain; and
if not allowed, not establishing the virtual network connection.

13. The method of claim 12 wherein the first end point, second end point, or both comprises an isolated virtual environment.

14. The method of claim 12 comprising:
if not allowed, dropping the request.

15. The method of claim 12 wherein one of the first or second network domains comprises a private network domain, and another of the first or second network domains comprises a public network domain.

16. A method comprising:
providing a cluster of virtual network switches, the cluster of virtual network switches being coupled to a first network domain and a second network domain, wherein the cluster of virtual network switches is separate from the first and second network domains, and the second network domain is separate from the first network domain;
providing a cluster of controllers coupled to the cluster of virtual network switches, the first network domain, and the second network domain;
storing at a first end point in the first network domain a static routing table comprising a list of virtual destination Internet Protocol (IP) addresses;
receiving at the first end point a request from a client to connect to a destination;
scanning the static routing table to determine whether an IP address of the destination is listed in the static routing table;
if the IP address is listed, seeking permission to use a virtual network connecting the first network domain to the second network domain, the destination being in the second network domain; and
upon a determination that use of the virtual network is permitted, establishing for the client a virtual network connection between the first end point and the destination to transmit a payload of the client from the first network domain to the second network domain, wherein the establishing comprises:
initiating by the first end point, as allowed by a controller of the cluster of controllers, first traffic from the first network domain to a virtual network switch of the cluster of virtual network switches, the first traffic thereby being first outbound traffic from the first network domain;
initiating by the destination, as allowed by the controller, second traffic from the second network domain to the virtual network switch, the second traffic thereby being second outbound traffic from the second network domain; and
placing the payload from the first network domain into a reply to the second outbound traffic from the second network domain.

17. The method of claim 16 comprising:
if the IP address is not listed, dropping the request.

18. The method of claim 16 comprising:
updating the static routing table; and
distributing the updated static routing table to the first end point.

19. The method of claim 16 comprising:
discovering a new end point;
based on the discovery, updating the static routing table to include a virtual destination IP address associated with the new end point; and
distributing the updated static routing table to first end point.

20. The method of claim 16 comprising:
discovering a deletion of an end point;
based on the discovery, updating the static routing table to remove a virtual destination IP address associated with the deleted end point; and
distributing the updated static routing table to the first end point.

* * * * *